United States Patent
Smith et al.

(10) Patent No.: US 12,170,805 B2
(45) Date of Patent: Dec. 17, 2024

(54) NETWORKED DEVICES, SYSTEMS, AND METHODS FOR ASSOCIATING PLAYBACK DEVICES BASED ON SOUND CODES

(71) Applicant: Sonos, Inc., Santa Barbara, CA (US)

(72) Inventors: Connor Kristopher Smith, New Hudson, MI (US); Charles Conor Sleith, Waltham, MA (US); John Tolomei, Renton, WA (US)

(73) Assignee: Sonos, Inc., Goleta, CA (US)

( * ) Notice: Subject to any disclaimer, the term of this patent is extended or adjusted under 35 U.S.C. 154(b) by 0 days.

(21) Appl. No.: 18/478,241

(22) Filed: Sep. 29, 2023

(65) Prior Publication Data

US 2024/0114192 A1 Apr. 4, 2024

Related U.S. Application Data

(63) Continuation of application No. 17/896,129, filed on Aug. 26, 2022, now Pat. No. 11,778,259, which is a
(Continued)

(51) Int. Cl.
*H04N 21/41* (2011.01)
*G06F 9/54* (2006.01)
(Continued)

(52) U.S. Cl.
CPC ....... *H04N 21/41265* (2020.08); *G06F 9/542* (2013.01); *G10L 15/22* (2013.01);
(Continued)

(58) Field of Classification Search
CPC ...... H04N 21/41265; H04N 21/43076; H04W 4/80; H04W 4/025; G06F 9/542;
(Continued)

(56) References Cited

U.S. PATENT DOCUMENTS 5,857,172 A 1/1999 Rozak
6,070,140 A 5/2000 Tran
(Continued)

FOREIGN PATENT DOCUMENTS

CN 104155938 A 11/2014
CN 104581510 A 4/2015
(Continued)

OTHER PUBLICATIONS

Non-Final Office Action mailed on Apr. 25, 2023, issued in connection with U.S. Appl. No. 17/656,794, filed Mar. 28, 2022, 22 pages.
(Continued)

*Primary Examiner* — Jonathan A Bui

(57) ABSTRACT

In one aspect, a playback device is provided that is configured to identify a trigger event indicating a request to associate the playback device with another playback device. Based on identifying the trigger event, the playback device is configured to create a first sound code based on a first sound specimen detected by the playback device. After identifying the trigger event, the playback device is configured to receive from the other playback device a sound object and based on receiving the sound object, identify a second sound code. The playback device is also configured to, based on the first sound code and the second sound code, determine that it and the other playback device have a spatial relationship. Based on that determination, the playback device is configured to cause it and the other playback device to be associated in accordance with the indicated request.

20 Claims, 12 Drawing Sheets

Related U.S. Application Data continuation of application No. 16/813,643, filed on Mar. 9, 2020, now Pat. No. 11,432,030, which is a continuation of application No. 16/131,392, filed on Sep. 14, 2018, now Pat. No. 10,587,430.

(51) Int. Cl.

| | | |
|---|---|---|
| *G10L 15/22* | (2006.01) | |
| *H04L 12/28* | (2006.01) | |
| *H04N 21/43* | (2011.01) | |
| *H04W 4/02* | (2018.01) | |
| *H04W 4/80* | (2018.01) | |

(52) U.S. Cl.
CPC ........ *H04L 12/2809* (2013.01); *H04L 12/282* (2013.01); *H04N 21/43076* (2020.08); *H04W 4/025* (2013.01); *H04W 4/80* (2018.02); *G10L 2015/223* (2013.01)

(58) Field of Classification Search
CPC ................. G10L 15/22; G10L 12/2809; G10L 12/282; G10L 2015/223
See application file for complete search history.

(56) References Cited

U.S. PATENT DOCUMENTS

| | | | |
|---|---|---|---|
| 6,219,645 | B1 | 4/2001 | Byers |
| 7,516,068 | B1 | 4/2009 | Clark |
| 8,489,398 | B1 | 7/2013 | Gruenstein |
| 8,676,273 | B1 | 3/2014 | Fujisaki |
| 8,762,156 | B2 | 6/2014 | Chen |
| 8,768,712 | B1 | 7/2014 | Sharifi |
| 8,898,063 | B1 | 11/2014 | Sykes et al. |
| 9,047,857 | B1 | 6/2015 | Barton |
| 9,070,367 | B1 | 6/2015 | Hoffmeister et al. |
| 9,148,742 | B1* | 9/2015 | Koulomzin ............ H04W 4/00 |
| 9,183,845 | B1 | 11/2015 | Gopalakrishnan et al. |
| 9,401,058 | B2* | 7/2016 | De La Fuente ......... G07C 9/37 |
| 9,491,033 | B1 | 11/2016 | Soyannwo et al. |
| 9,514,747 | B1 | 12/2016 | Bisani et al. |
| 9,542,941 | B1 | 1/2017 | Weksler et al. |
| 9,672,812 | B1 | 6/2017 | Watanabe et al. |
| 9,691,384 | B1 | 6/2017 | Wang et al. |
| 9,900,723 | B1* | 2/2018 | Choisel .................. H04S 7/305 |
| 10,038,419 | B1 | 7/2018 | Elliot et al. |
| 10,157,042 | B1 | 12/2018 | Jayakumar et al. |
| 10,204,624 | B1 | 2/2019 | Knudson et al. |
| 10,249,205 | B2 | 4/2019 | Hammersley et al. |
| 10,304,440 | B1 | 5/2019 | Panchapagesan et al. |
| 10,565,999 | B2 | 1/2020 | Wilberding |
| 10,567,515 | B1 | 2/2020 | Bao |
| 10,586,534 | B1 | 3/2020 | Argyropoulos et al. |
| 10,720,173 | B2 | 7/2020 | Freeman et al. |
| 10,735,870 | B2 | 8/2020 | Ballande et al. |
| 10,746,840 | B1 | 8/2020 | Barton et al. |
| 10,789,041 | B2 | 9/2020 | Kim et al. |
| 10,847,137 | B1 | 11/2020 | Mandal et al. |
| 10,847,164 | B2 | 11/2020 | Wilberding |
| 10,878,811 | B2 | 12/2020 | Smith et al. |
| 10,885,091 | B1 | 1/2021 | Meng et al. |
| 11,025,569 | B2 | 6/2021 | Lind et al. |
| 11,062,705 | B2 | 7/2021 | Watanabe et al. |
| 11,138,969 | B2 | 10/2021 | D'Amato |
| 11,159,878 | B1 | 10/2021 | Chatlani et al. |
| 11,184,969 | B2 | 11/2021 | Lang |
| 11,361,763 | B1 | 6/2022 | Maas et al. |
| 11,373,645 | B1 | 6/2022 | Mathew et al. |
| 11,475,899 | B2 | 10/2022 | Lesso |
| 11,531,520 | B2 | 12/2022 | Wilberding |
| 2002/0055950 | A1 | 5/2002 | Witteman |
| 2002/0143532 | A1 | 10/2002 | McLean et al. |
| 2003/0097482 | A1 | 5/2003 | DeHart et al. |
| 2004/0153321 | A1 | 8/2004 | Chung et al. |
| 2006/0104454 | A1 | 5/2006 | Guitarte Perez et al. |
| 2007/0038461 | A1 | 2/2007 | Abbott et al. |
| 2008/0160977 | A1* | 7/2008 | Ahmaniemi ............ H04W 4/02 709/204 |
| 2009/0013255 | A1 | 1/2009 | Yuschik et al. |
| 2009/0299745 | A1 | 12/2009 | Kennewick et al. |
| 2012/0224457 | A1* | 9/2012 | Kim ...................... H04W 4/025 367/137 |
| 2013/0080167 | A1 | 3/2013 | Mozer |
| 2013/0080171 | A1 | 3/2013 | Mozer et al. |
| 2013/0185639 | A1 | 7/2013 | Lim |
| 2013/0283169 | A1 | 10/2013 | Van Wie |
| 2013/0289994 | A1 | 10/2013 | Newman et al. |
| 2013/0322634 | A1 | 12/2013 | Bennett et al. |
| 2014/0167929 | A1 | 6/2014 | Shim et al. |
| 2014/0181199 | A1 | 6/2014 | Kumar et al. |
| 2014/0188476 | A1 | 7/2014 | Li et al. |
| 2014/0244269 | A1 | 8/2014 | Tokutake |
| 2014/0278343 | A1 | 9/2014 | Tran |
| 2014/0364089 | A1 | 12/2014 | Lienhart et al. |
| 2014/0365225 | A1 | 12/2014 | Haiut |
| 2015/0032456 | A1 | 1/2015 | Wait |
| 2015/0039310 | A1 | 2/2015 | Clark et al. |
| 2015/0039311 | A1 | 2/2015 | Clark et al. |
| 2015/0073807 | A1 | 3/2015 | Kumar |
| 2015/0124975 | A1* | 5/2015 | Pontoppidan ........... G06F 3/162 381/23.1 |
| 2015/0154953 | A1 | 6/2015 | Bapat et al. |
| 2015/0221307 | A1 | 8/2015 | Shah et al. |
| 2015/0222563 | A1* | 8/2015 | Burns ..................... H04W 4/80 709/226 |
| 2015/0373100 | A1 | 12/2015 | Kravets et al. |
| 2016/0014536 | A1 | 1/2016 | Sheen |
| 2016/0027440 | A1 | 1/2016 | Gelfenbeyn et al. |
| 2016/0034448 | A1 | 2/2016 | Tran |
| 2016/0055847 | A1 | 2/2016 | Dahan |
| 2016/0118048 | A1 | 4/2016 | Heide |
| 2016/0148612 | A1 | 5/2016 | Guo et al. |
| 2016/0335485 | A1 | 11/2016 | Kim |
| 2016/0379635 | A1 | 12/2016 | Page |
| 2017/0084278 | A1 | 3/2017 | Jung |
| 2017/0110130 | A1 | 4/2017 | Sharifi et al. |
| 2017/0242653 | A1* | 8/2017 | Lang ....................... G06F 3/162 |
| 2017/0332035 | A1 | 11/2017 | Shah et al. |
| 2018/0033429 | A1 | 2/2018 | Makke et al. |
| 2018/0061409 | A1 | 3/2018 | Valentine et al. |
| 2018/0084367 | A1* | 3/2018 | Greff ..................... G10L 19/008 |
| 2018/0091898 | A1* | 3/2018 | Yoon .................. H04N 21/4852 |
| 2018/0096678 | A1 | 4/2018 | Zhou et al. |
| 2018/0120947 | A1 | 5/2018 | Wells et al. |
| 2018/0132298 | A1* | 5/2018 | Birnam .................. H04B 11/00 |
| 2018/0137857 | A1 | 5/2018 | Zhou et al. |
| 2018/0165055 | A1* | 6/2018 | Yu ............................ H04S 7/307 |
| 2018/0167981 | A1* | 6/2018 | Jonna .................... H04W 12/65 |
| 2018/0270575 | A1 | 9/2018 | Akutagawa |
| 2018/0350356 | A1 | 12/2018 | Garcia |
| 2018/0350379 | A1 | 12/2018 | Wung et al. |
| 2018/0352014 | A1 | 12/2018 | Alsina et al. |
| 2018/0352334 | A1 | 12/2018 | Family et al. |
| 2018/0358019 | A1 | 12/2018 | Mont-Reynaud |
| 2018/0367944 | A1* | 12/2018 | Heo ........................ G06F 1/163 |
| 2019/0035404 | A1 | 1/2019 | Gabel et al. |
| 2019/0044745 | A1 | 2/2019 | Knudson et al. |
| 2019/0051299 | A1 | 2/2019 | Ossowski et al. |
| 2019/0066680 | A1 | 2/2019 | Woo et al. |
| 2019/0066710 | A1 | 2/2019 | Bryan et al. |
| 2019/0073999 | A1 | 3/2019 | Prémont et al. |
| 2019/0081507 | A1* | 3/2019 | Ide ....................... H02J 13/0004 |
| 2019/0122662 | A1 | 4/2019 | Chang et al. |
| 2019/0156847 | A1 | 5/2019 | Bryan et al. |
| 2019/0172476 | A1 | 6/2019 | Wung et al. |
| 2019/0237089 | A1 | 8/2019 | Shin |
| 2019/0259408 | A1 | 8/2019 | Freeman et al. |
| 2019/0281387 | A1 | 9/2019 | Woo et al. |
| 2019/0287536 | A1 | 9/2019 | Sharifi et al. |
| 2019/0295563 | A1* | 9/2019 | Kamdar ............... G10L 21/0208 |
| 2019/0311715 | A1 | 10/2019 | Pfeffinger et al. |
| 2019/0311718 | A1 | 10/2019 | Huber et al. |
| 2019/0311722 | A1 | 10/2019 | Caldwell |
| 2019/0318729 | A1 | 10/2019 | Chao et al. |

(56) References Cited

U.S. PATENT DOCUMENTS

| | | |
|---|---|---|
| 2019/0325870 A1 | 10/2019 | Mitic |
| 2019/0325888 A1 | 10/2019 | Geng |
| 2019/0341037 A1 | 11/2019 | Bromand et al. |
| 2019/0341038 A1 | 11/2019 | Bromand et al. |
| 2019/0371324 A1 | 12/2019 | Powell et al. |
| 2019/0371329 A1 | 12/2019 | D'Souza et al. |
| 2019/0392832 A1 | 12/2019 | Mitsui et al. |
| 2020/0066279 A1 | 2/2020 | Kang et al. |
| 2020/0075018 A1 | 3/2020 | Chen |
| 2020/0135194 A1 | 4/2020 | Jeong |
| 2020/0244650 A1 | 7/2020 | Burris et al. |
| 2020/0265842 A1 | 8/2020 | Singh |
| 2021/0029452 A1 | 1/2021 | Tsoi et al. |
| 2021/0249004 A1 | 8/2021 | Smith |
| 2021/0358481 A1 | 11/2021 | D'Amato et al. |
| 2022/0036882 A1 | 2/2022 | Ahn et al. |
| 2022/0083136 A1 | 3/2022 | DeLeeuw |
| 2022/0301561 A1 | 9/2022 | Robert Jose et al. |
| 2023/0019595 A1 | 1/2023 | Smith |

FOREIGN PATENT DOCUMENTS

| | | |
|---|---|---|
| CN | 105101083 A | 11/2015 |
| CN | 107465974 A | 12/2017 |
| EP | 3142107 A1 | 3/2017 |
| GB | 2501367 A | 10/2013 |
| JP | 2004096520 A | 3/2004 |
| JP | 2004163590 A | 6/2004 |
| JP | 2008217444 A | 9/2008 |
| JP | 2016009193 A | 1/2016 |
| JP | 2019109510 A | 7/2019 |
| KR | 101284134 B1 | 7/2013 |
| WO | 2020068795 A1 | 4/2020 |
| WO | 2020132298 A1 | 6/2020 |

OTHER PUBLICATIONS

Non-Final Office Action mailed on May 25, 2023, issued in connection with U.S. Appl. No. 18/157,937, filed Jan. 23, 2023, 9 pages.
Non-Final Office Action mailed on Aug. 28, 2023, issued in connection with U.S. Appl. No. 17/722,661, filed Apr. 18, 2022, 16 pages.
Non-Final Office Action mailed on Jul. 3, 2023, issued in connection with U.S. Appl. No. 17/135,173, filed Dec. 28, 2020, 22 pages.
Non-Final Office Action mailed on Apr. 5, 2023, issued in connection with U.S. Appl. No. 18/145,501, filed Dec. 22, 2022, 6 pages.
Non-Final Office Action mailed on Jul. 5, 2023, issued in connection with U.S. Appl. No. 18/061,579, filed Dec. 5, 2022, 11 pages.
Non-Final Office Action mailed on Oct. 6, 2023, issued in connection with U.S. Appl. No. 17/222,950, filed Apr. 5, 2021, 9 pages.
Non-Final Office Action mailed on Jun. 7, 2023, issued in connection with U.S. Appl. No. 16/179,779, filed Nov. 2, 2018, 29 pages.
Non-Final Office Action mailed on Sep. 7, 2023, issued in connection with U.S. Appl. No. 17/340,590, filed Jun. 7, 2021, 18 pages.
Non-Final Office Action mailed on Jun. 8, 2023, issued in connection with U.S. Appl. No. 18/048,034, filed Oct. 20, 2022, 8 pages.
Non-Final Office Action mailed on Jun. 8, 2023, issued in connection with U.S. Appl. No. 18/061,243, filed Dec. 2, 2022, 10 pages.
Notice of Allowance mailed on Jun. 9, 2023, issued in connection with U.S. Appl. No. 17/532,674, filed Nov. 22, 2021, 13 pages.
Notice of Allowance mailed on Jul. 10, 2023, issued in connection with U.S. Appl. No. 17/315,599, filed May 10, 2021, 2 pages.
Notice of Allowance mailed on Aug. 11, 2023, issued in connection with U.S. Appl. No. 17/878,649, filed Aug. 1, 2022, 7 pages.
Notice of Allowance mailed on May 11, 2023, issued in connection with U.S. Appl. No. 18/061,638, filed Dec. 5, 2022, 15 pages.
Notice of Allowance mailed on Jul. 12, 2023, issued in connection with U.S. Appl. No. 18/151,619, filed Jan. 9, 2023, 13 pages.
Notice of Allowance mailed on Jun. 12, 2023, issued in connection with U.S. Appl. No. 17/453,632, filed Nov. 4, 2021, 9 pages.
Notice of Allowance mailed on Jul. 13, 2023, issued in connection with U.S. Appl. No. 18/145,501, filed Dec. 22, 2022, 9 pages.
Notice of Allowance mailed on Jun. 13, 2023, issued in connection with U.S. Appl. No. 17/249,776, filed Mar. 12, 2021, 10 pages.
Notice of Allowance mailed on Aug. 14, 2023, issued in connection with U.S. Appl. No. 17/549,034, filed Dec. 13, 2021, 9 pages.
Notice of Allowance mailed on Sep. 14, 2023, issued in connection with U.S. Appl. No. 18/061,579, filed Dec. 5, 2022, 7 pages.
Notice of Allowance mailed on Jun. 15, 2023, issued in connection with U.S. Appl. No. 17/305,698, filed Jul. 13, 2021, 8 pages.
Notice of Allowance mailed on Jun. 15, 2023, issued in connection with U.S. Appl. No. 17/305,920, filed Jul. 16, 2021, 8 pages.
Notice of Allowance mailed on Aug. 16, 2023, issued in connection with U.S. Appl. No. 17/536,572, filed Nov. 29, 2021, 7 pages.
Notice of Allowance mailed on Oct. 2, 2023, issued in connection with U.S. Appl. No. 17/810,533, filed Jul. 1, 2022, 8 pages.
Notice of Allowance mailed on Aug. 21, 2023, issued in connection with U.S. Appl. No. 17/548,921, filed Dec. 13, 2021, 10 pages.
Notice of Allowance mailed on Jul. 21, 2023, issued in connection with U.S. Appl. No. 17/986,241, filed Nov. 14, 2022, 12 pages.
Notice of Allowance mailed on Nov. 24, 2023, issued in connection with U.S. Appl. No. 18/070,024, filed Nov. 28, 2022, 7 pages.
Notice of Allowance mailed on Apr. 26, 2022, issued in connection with U.S. Appl. No. 17/896,129, filed Aug. 26, 2022, 8 pages.
Notice of Allowance mailed on Apr. 26, 2023, issued in connection with U.S. Appl. No. 17/658,717, filed Apr. 11, 2022, 11 pages.
Notice of Allowance mailed on Sep. 27, 2023, issued in connection with U.S. Appl. No. 17/656,794, filed Mar. 28, 2022, 11 pages.
Notice of Allowance mailed on Sep. 27, 2023, issued in connection with U.S. Appl. No. 18/048,945, filed Oct. 24, 2022, 9 pages.
Notice of Allowance mailed on Sep. 27, 2023, issued in connection with U.S. Appl. No. 18/061,243, filed Dec. 2, 2022, 8 pages.
Notice of Allowance mailed on Sep. 29, 2023, issued in connection with U.S. Appl. No. 16/168,389, filed Oct. 23, 2018, 11 pages.
Notice of Allowance mailed on Jun. 30, 2023, issued in connection with U.S. Appl. No. 17/303,001, filed May 18, 2021, 8 pages.
Notice of Allowance mailed on Aug. 31, 2023, issued in connection with U.S. Appl. No. 18/145,520, filed Dec. 22, 2022, 2 pages.
Notice of Allowance mailed on Mar. 31, 2023, issued in connection with U.S. Appl. No. 17/303,735, filed Jun. 7, 2021, 19 pages.
Notice of Allowance mailed on Aug. 4, 2023, issued in connection with U.S. Appl. No. 18/145,520, filed Dec. 22, 2022, 10 pages.
Notice of Allowance mailed on Apr. 5, 2023, issued in connection with U.S. Appl. No. 17/549,253, filed Dec. 13, 2021, 10 pages.
Notice of Allowance mailed on Nov. 8, 2023, issued in connection with U.S. Appl. No. 18/066,093, filed Dec. 14, 2022, 11 pages.
Wolf et al. On the potential of channel selection for recognition of reverberated speech with multiple microphones. INTERSPEECH, TALP Research Center, Jan. 2010, 5 pages.
Wölfel et al. Multi-source far-distance microphone selection and combination for automatic transcription of lectures, INTERSPEECH 2006—ICSLP, Jan. 2006, 5 pages.
Zhang et al. Noise Robust Speech Recognition Using Multi-Channel Based Channel Selection And Channel Weighting. The Institute of Electronics, Information and Communication Engineers, arXiv:1604.03276v1 [cs. SD] Jan. 1, 2010, 8 pages.
Australian Patent Office, Australian Examination Report Action mailed on Jul. 11, 2023, issued in connection with Australian Application No. 2022246446, 2 pages.
Australian Patent Office, Australian Examination Report Action mailed on Jun. 14, 2023, issued in connection with Australian Application No. 2019299865, 2 pages.
Australian Patent Office, Australian Examination Report Action mailed on Sep. 25, 2023, issued in connection with Australian Application No. 2018338812, 3 pages.
Australian Patent Office, Australian Examination Report Action mailed on Oct. 31, 2023, issued in connection with Australian Application No. 2023203687, 2 pages.
Canadian Patent Office, Canadian Examination Report mailed on Oct. 12, 2023, issued in connection with Canadian Application No. 3084279, 4 pages.

(56) References Cited

OTHER PUBLICATIONS

Chinese Patent Office, First Office Action and Translation mailed on Sep. 6, 2023, issued in connection with Chinese Application No. 202010179593.8, 14 pages.
Chinese Patent Office, Second Office Action and Translation mailed on Apr. 1, 2023, issued in connection with Chinese Application No. 201980056604.9, 11 pages.
Chinese Patent Office, Second Office Action mailed on May 30, 2023, issued in connection with Chinese Application No. 201980070006.7, 9 pages.
European Patent Office, European EPC Article 94.3 mailed on Jun. 5, 2023, issued in connection with European Application No. 20710649.3, 8 pages.
European Patent Office, European EPC Article 94.3 mailed on Oct. 12, 2023, issued in connection with European Application No. 20736489.4, 8 pages.
European Patent Office, European EPC Article 94.3 mailed on Jun. 27, 2023, issued in connection with European Application No. 21195031.6, 4 pages.
European Patent Office, European EPC Article 94.3 mailed on Nov. 27, 2023, issued in connection with European Application No. 19780508.8, 7 pages.
European Patent Office, European EPC Article 94.3 mailed on Mar. 29, 2023, issued in connection with European Application No. 22182193.7, 4 pages.
European Patent Office, European EPC Article 94.3 mailed on Aug. 31, 2023, issued in connection with European Application No. 19773326.4, 5 pages.
European Patent Office, European EPC Article 94.3 mailed on Jul. 31, 2023, issued in connection with European Application No. 21164130.3, 5 pages.
European Patent Office, European EPC Article 94.3 mailed on Apr. 6, 2023, issued in connection with European Application No. 21193616.6, 7 pages.
European Patent Office, European EPC Article 94.3 mailed on Sep. 6, 2023, issued in connection with European Application No. 19197116.7, 4 pages.
European Patent Office, European EPC Article 94.3 mailed on Sep. 7, 2023, issued in connection with European Application No. 20185599.6, 6 pages.
European Patent Office, European Search Report mailed on Sep. 21, 2023, issued in connection with European Application No. 23172783.5, 8 pages.
Final Office Action mailed on May 17, 2023, issued in connection with U.S. Appl. No. 16/168,389, filed Oct. 23, 2018, 44 pages.
Final Office Action mailed on Aug. 22, 2023, issued in connection with U.S. Appl. No. 18/061,570, filed Dec. 5, 2022, 12 pages.
Final Office Action mailed on Aug. 25, 2023, issued in connection with U.S. Appl. No. 16/989,350, filed Aug. 10, 2020, 21 pages.
Final Office Action mailed on Sep. 27, 2023, issued in connection with U.S. Appl. No. 18/048,034, filed Oct. 20, 2022, 9 pages.
Final Office Action mailed on Oct. 6, 2023, issued in connection with U.S. Appl. No. 17/532,744, filed Nov. 22, 2021, 21 pages.
Final Office Action mailed on Aug. 9, 2023, issued in connection with U.S. Appl. No. 17/493,430, filed Oct. 4, 2021, 19 pages.
*Google LLC* v. *Sonos, Inc.*, International Trade Commission Case No. 337-TA-1330, Order No. 25: Regarding Respondent Sonos, Inc.'s Omnibus Motion for Summary Determination; dated May 16, 2023, 7 pages.
*Google LLC* v. *Sonos, Inc.*, International Trade Commission Case No. 337-TA-1330, Order No. 28: Regarding Respondent Sonos, Inc.'s Omnibus Motion for Summary Determination; dated May 22, 2023, 3 pages.
*Google LLC* v. *Sonos, Inc.*, International Trade Commission Case No. 337-TA-1330, Order No. 37: Regarding Complainant Google LLC's Motions in Limine; dated Jul. 7, 2023, 10 pages.
*Google LLC* v. *Sonos, Inc.*, International Trade Commission Case No. 337-TA-1330, Respondent Sonos, Inc.'s Motion in Limine No. 4. Motion to Exclude Untimely Validity Arguments Regarding Claim 11 of U.S. Pat. No. 11,024,311; dated Jun. 13, 2023, 34 pages.
*Google LLC* v. *Sonos, Inc.*, International Trade Commission Case No. 337-TA-1330, Respondent Sonos, Inc.'s Response to Google's Motion in Limine No. 3 Preclude Sonos from Presenting Evidence or Argument that Claim 3 of the '748 Patent is Indefinite for Lack of Antecedent Basis; dated Jun. 12, 2023, 26 pages.
International Bureau, International Search Report and Written Opinion mailed on Mar. 20, 2023, issued in connection with International Application No. PCT/US2022/045399, filed on Sep. 30, 2022, 25 pages.
International Searching Authority, Invitation to Pay Additional Fees on Jan. 27, 2023, issued in connection with International Application No. PCT/US2022/045399, filed on Sep. 30, 2022, 19 pages.
Japanese Patent Office, Decision of Refusal and Translation mailed on May 23, 2023, issued in connection with Japanese Patent Application No. 2021-163622, 13 pages.
Japanese Patent Office, Non-Final Office Action mailed on Apr. 4, 2023, issued in connection with Japanese Patent Application No. 2021-573944, 5 pages.
Japanese Patent Office, Notice of Reasons for Refusal and Translation mailed on Aug. 8, 2023, issued in connection with Japanese Patent Application No. 2022-101346, 6 pages.
Katsamanis et al. Robust far-field spoken command recognition for home automation combining adaptation and multichannel processing. ICASSP, IEEE International Conference on Acoustics, Speech and Signal Processing—Proceedings, May 2014, pp. 5547-5551.
Korean Patent Office, Korean Examination Report and Translation mailed on Apr. 10, 2023, issued in connection with Korean Application No. 10-2022-7024007, 8 pages.
Korean Patent Office, Korean Examination Report and Translation mailed on Jul. 19, 2023, issued in connection with Korean Application No. 10-2022-7024007, 9 pages.
Korean Patent Office, Korean Examination Report and Translation mailed on Mar. 31, 2023, issued in connection with Korean Application No. 10-2022-7016656, 7 pages.
Mathias Wolfel. Channel Selection by Class Separability Measures for Automatic Transcriptions on Distant Microphones, INTERSPEECH 2007 10.21437/Interspeech.2007-255, 4 pages.
Non-Final Office Action mailed on Aug. 10, 2023, issued in connection with U.S. Appl. No. 18/070,024, filed Nov. 28, 2022, 4 pages.
Non-Final Office Action mailed on Apr. 12, 2023, issued in connection with U.S. Appl. No. 17/878,649, filed Aug. 1, 2022, 16 pages.
Non-Final Office Action mailed on Sep. 14, 2023, issued in connection with U.S. Appl. No. 17/528,843, filed Nov. 17, 2021, 20 pages.
Non-Final Office Action mailed on Jul. 18, 2023, issued in connection with U.S. Appl. No. 18/066,093, filed Dec. 14, 2022, 12 pages.
Non-Final Office Action mailed on Apr. 20, 2023, issued in connection with U.S. Appl. No. 18/061,570, filed Dec. 5, 2022, 12 pages.
Non-Final Office Action mailed on Nov. 21, 2023, issued in connection with U.S. Appl. No. 18/088,976, filed Dec. 27, 2022, 9 pages.
Non-Final Office Action mailed on Jun. 23, 2023, issued in connection with U.S. Appl. No. 18/048,945, filed Oct. 24, 2022, 10 pages.
Non-Final Office Action mailed on Oct. 23, 2023, issued in connection with U.S. Appl. No. 17/932,715, filed Sep. 16, 2022, 14 pages.
Non-Final Office Action mailed on Apr. 24, 2023, issued in connection with U.S. Appl. No. 17/532,744, filed Nov. 22, 2021, 18 pages.
Non-Final Office Action mailed on Apr. 25, 2023, issued in connection with U.S. Appl. No. 17/536,572, filed Nov. 29, 2021, 8 pages.

\* cited by examiner

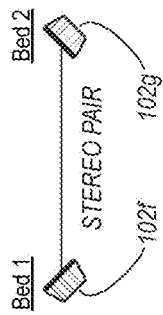
*Figure 3B*
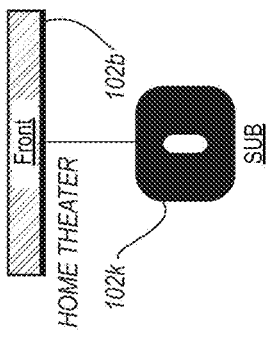
*Figure 3C*
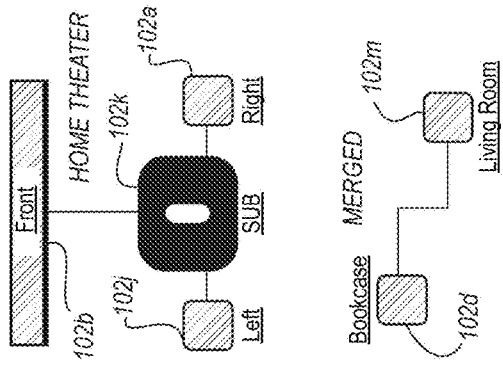
*Figure 3D*
*Figure 3E*
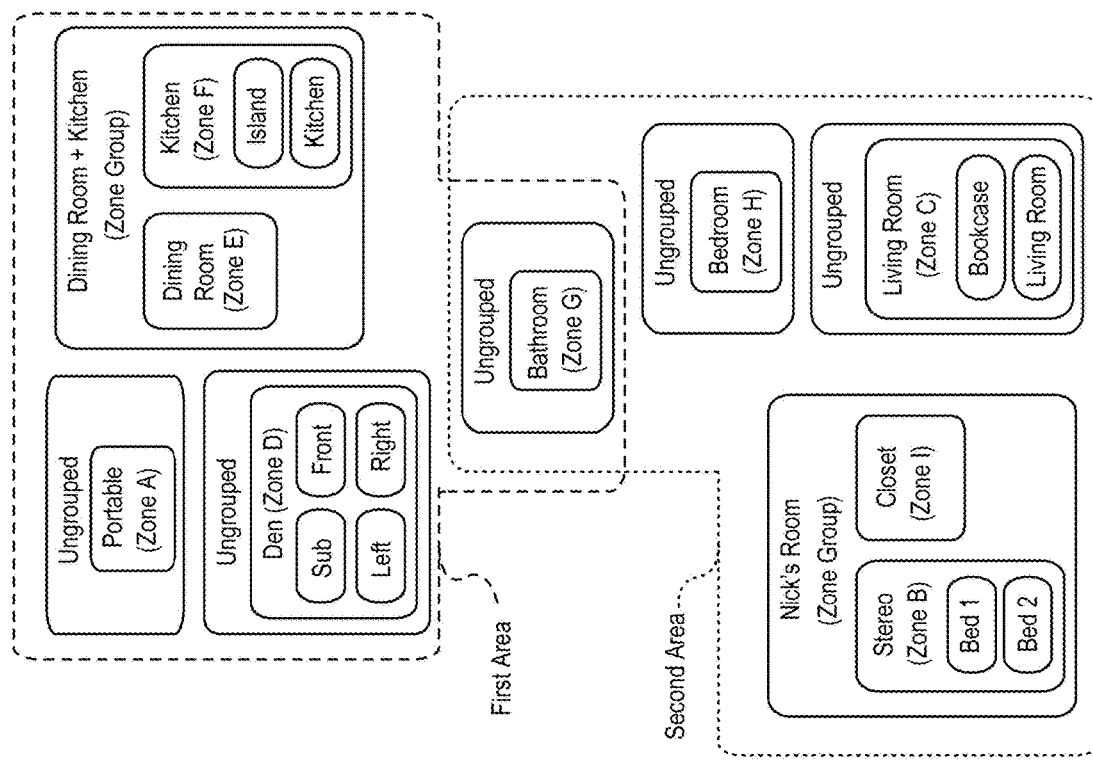
*Figure 3A*

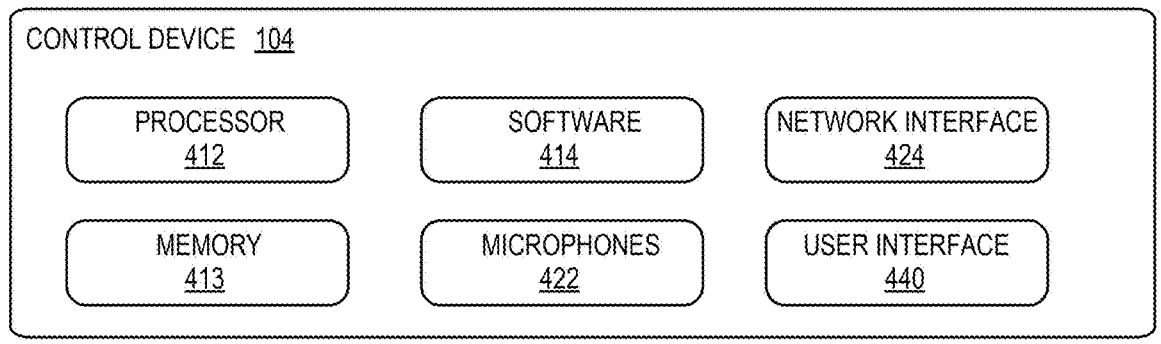
Figure 4A
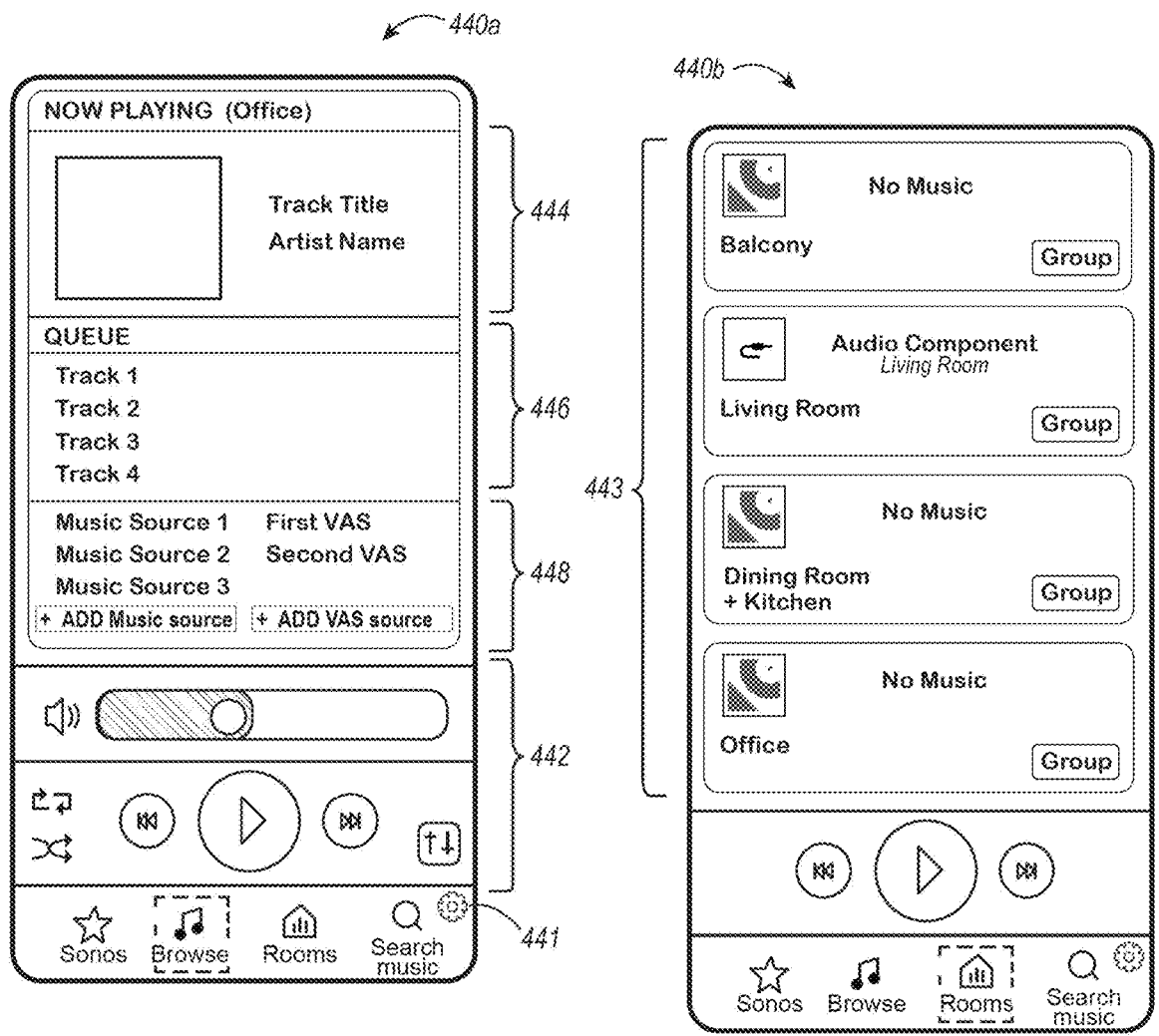
Figure 4B
Figure 4C

NETWORKED DEVICES, SYSTEMS, AND METHODS FOR ASSOCIATING PLAYBACK DEVICES BASED ON SOUND CODES

CROSS-REFERENCE TO RELATED APPLICATIONS

The present application claims priority to, and is a continuation of, U.S. application Ser. No. 17/896,129, filed on Aug. 26, 2022, and titled "Networked Devices, Systems, & Methods for Associating Playback Devices Based on Sound Codes," which is a continuation of U.S. application Ser. No. 16/813,643, filed on Mar. 9, 2020, issued as U.S. Pat. No. 11,432,030, and titled "Networked Devices, Systems, & Methods for Associating Playback Devices Based on Sound Codes," which is a continuation of U.S. application Ser. No. 16/131,392, filed on Sep. 14, 2018, issued as U.S. Pat. No. 10,587,430, and titled "Networked Devices, Systems, & Methods for Associating Playback Devices Based on Sound Codes," the contents of each of which are hereby incorporated by reference in their entirety.

TECHNICAL FIELD

The present technology relates to consumer goods and, more particularly, to methods, systems, products, features, services, and other elements directed to voice-controllable media playback systems or some aspect thereof.

BACKGROUND

Options for accessing and listening to digital audio in an out-loud setting were limited until in 2003, when SONOS, Inc. filed for one of its first patent applications, entitled "Method for Synchronizing Audio Playback between Multiple Networked Devices," and began offering a media playback system for sale in 2005. The SONOS Wireless HiFi System enables people to experience music from many sources via one or more networked playback devices. Through a software control application installed on a smartphone, tablet, or computer, one can play what he or she wants in any room that has a networked playback device. Additionally, using a controller, for example, different songs can be streamed to each room that has a playback device, rooms can be grouped together for synchronous playback, or the same song can be heard in all rooms synchronously.

Given the ever-growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings where:

FIGS. 3A-3E are diagrams showing example playback device configurations in accordance with aspects of the disclosure;

FIG. 4A is a functional block diagram of an example controller device in accordance with aspects of the disclosure;

FIGS. 4B and 4C are controller interfaces in accordance with aspects of the disclosure;

Figure 1A:
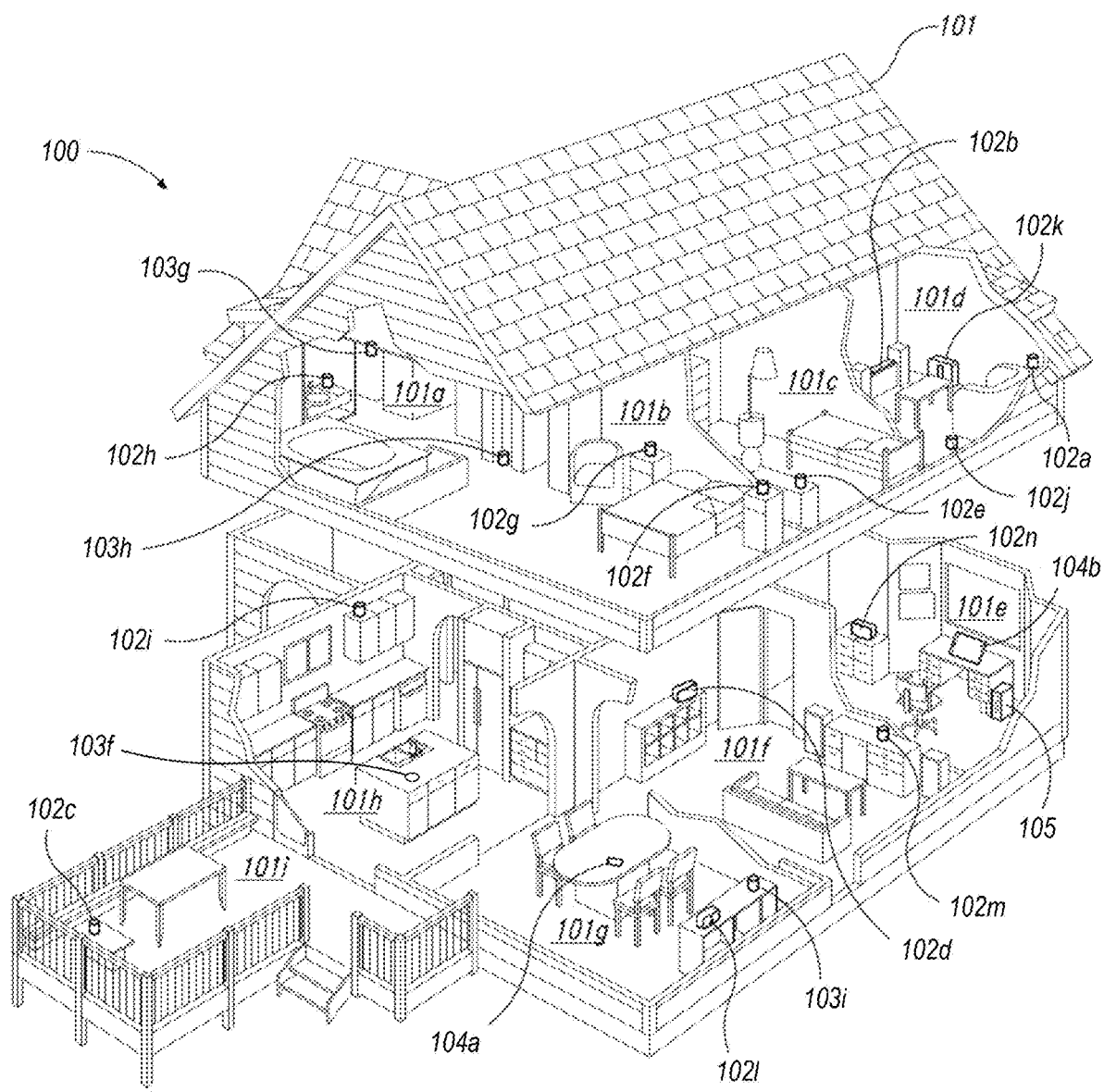
FIG. 1A is a partial cutaway view of an environment having a media playback system configured in accordance with aspects of the disclosed technology.

The drawings are for purposes of illustrating example embodiments, but it should be understood that the inventions are not limited to the arrangements and instrumentality shown in the drawings. In the drawings, identical reference numbers identify at least generally similar elements. To facilitate the discussion of any particular element, the most significant digit or digits of any reference number refers to the Figure in which that element is first introduced. For example, element 103a is first introduced and discussed with reference to FIG. 1A.

DETAILED DESCRIPTION

I. Overview

Voice control can be beneficial in a "smart" home that includes smart appliances and devices that are connected to a communication network, such as wireless audio playback devices, illumination devices, and home-automation devices (e.g., thermostats, door locks, etc.). In some implementations, network microphone devices may be used to control smart home devices.

A network microphone device ("NMD") is a networked computing device that typically includes an arrangement of microphones, such as a microphone array, that is configured to detect sounds present in the NMD's environment. The detected sound may include a person's speech mixed with background noise (e.g., music being output by a playback device or other ambient noise). In practice, an NMD typically filters detected sound to remove the background noise from the person's speech to facilitate identifying whether the speech contains a voice input indicative of voice control. If so, the NMD may take action based on such a voice input.

A voice input will typically include a wake word followed by an utterance comprising a user request. In practice, a wake word is typically a predetermined word or phrase used to "wake up" an NMD and cause it to invoke a particular voice assistant service ("VAS") to interpret the intent of voice input in detected sound. For example, a user might speak the wake word "Alexa" to invoke the AMAZON VAS, "Ok, Google" to invoke the GOOGLE VAS, "Hey, Siri" to invoke the APPLE VAS, or "Hey, Sonos" to invoke a VAS offered by SONOS, among other examples. In practice, a wake word may also be referred to as, for example, an activation-, trigger-, wakeup-word or -phrase, and may take the form of any suitable word, combination of words (e.g., a particular phrase), and/or some other audio cue.

An NMD often employs a wake-word engine, which is typically onboard the NMD, to identify whether sound detected by the NMD contains a voice input that includes a particular wake word. The wake-word engine may be configured to identify (i.e., "spot") a particular wake word using one or more identification algorithms. This wake-word identification process is commonly referred to as "keyword spotting." In practice, to help facilitate keyword spotting, the NMD may buffer sound detected by a microphone of the NMD and then use the wake-word engine to process that buffered sound to determine whether a wake word is present.

When a wake-word engine spots a wake word in detected sound, the NMD may determine that a wake-word event (i.e., a "wake-word trigger") has occurred, which indicates that the NMD has detected sound that includes a potential voice input. The occurrence of the wake-word event typically causes the NMD to perform additional processes involving the detected sound. In some implementations, these additional processes may include outputting an alert (e.g., an audible chime and/or a light indicator) indicating that a wake word has been identified and extracting detected-sound data from a buffer, among other possible additional processes. Extracting the detected sound may include reading out and packaging a stream of the detected-sound according to a particular format and transmitting the packaged sound-data to an appropriate VAS for interpretation.

In turn, the VAS corresponding to the wake word that was identified by the wake-word engine receives the transmitted sound data from the NMD over a communication network. A VAS traditionally takes the form of a remote service implemented using one or more cloud servers configured to process voice inputs (e.g., AMAZON's ALEXA, APPLE's SIRI, MICROSOFT's CORTANA, GOOGLE'S ASSISTANT, etc.). In some instances, certain components and functionality of the VAS may be distributed across local and remote devices. Additionally, or alternatively, a VAS may take the form of a local service implemented at an NMD or a media playback system comprising the NMD such that a voice input or certain types of voice input (e.g., rudimentary commands) are processed locally without intervention from a remote VAS.

In any case, when a VAS receives detected-sound data, the VAS will typically process this data, which involves identifying the voice input and determining an intent of words captured in the voice input. The VAS may then provide a response back to the NMD with some instruction according to the determined intent. Based on that instruction, the NMD may cause one or more smart devices to perform an action. For example, in accordance with an instruction from a VAS, an NMD may cause a playback device to play a particular song or an illumination device to turn on/off, among other examples. In some cases, an NMD, or a media system with NMDs (e.g., a media playback system with NMD-equipped playback devices) may be configured to interact with multiple VASes. In practice, the NMD may select one VAS over another based on the particular wake word identified in the sound detected by the NMD.

In some implementations, a playback device that is configured to be part of a networked media playback system may include components and functionality of an NMD (i.e., the playback device is "NMD-equipped"). In this respect, such a playback device may include a microphone that is configured to detect sounds present in the playback device's environment, such as people speaking, audio being output by the playback device itself or another playback device that is nearby, or other ambient noises, and may also include components for buffering detected sound to facilitate wake-word identification.

Some NMD-equipped playback devices may include an internal power source (e.g., a rechargeable battery) that allows the playback device to operate without being physically connected to a wall electrical outlet or the like. In this regard, such a playback device may be referred to herein as a "portable playback device." On the other hand, playback devices that are configured to rely on power from a wall electrical outlet or the like may be referred to herein as "stationary playback devices," although such devices may in fact be moved around a home or other environment. In practice, a person might often take a portable playback device to and from a home or other environment in which one or more stationary playback devices remain.

In the context of a networked media playback system, such as a SONOS Wireless HiFi System, there are various associations that can be defined between two or more playback devices and these associations may be changed over time. As one example of such an association, a media playback system may initially comprise a first playback device, and a second playback device may subsequently join the media playback system, thereby associating the first and second playback devices. As another example of such an association, a playback group may be defined comprising two or more playback devices in which those playback devices are configured to playback audio in synchrony with one another. Such a playback group may also be referred to as a "synchrony group." As yet another example of an association defined between playback devices, a first playback device may be playing back audio, which may then be transferred to a second playback device causing that device to play back the audio. There are various other examples of associations between two or more playback devices, some of which are discussed below.

In practice, associations can be defined between multiple stationary playback devices, multiple portable playback devices, or one or more stationary playback devices and one or more portable playback devices. Typically, associations between playback devices are defined in response to a user providing multiple inputs at a controller device of the media playback system. However, in some instances, it may be beneficial for a playback device of a media playback system to be able to determine whether any other playback device— that may have been previously removed from the environment in which the media playback system is located—is presently in proximity to the playback device and, therefore, available for association with the playback device.

Example devices, systems, and methods disclosed herein provide an improvement to technologies currently used to associate playback devices, among other improvements. At a high level, a playback device (e.g., a stationary playback device) is configured to determine whether a spatial relationship exists between itself and one or more other playback devices (e.g., one or more portable playback devices) based on sound codes for each device that are representative of respective sound specimens from each device's surroundings, which may then facilitate associating the playback device with the one or more other playback devices. This functionality may alleviate the need for a user to operate a controller device in order to associate playback devices and/or may minimize a user's involvement in such procedures.

For instance, in some embodiments, a first playback device (e.g., a stationary, NMD-equipped playback device) may identify a trigger event indicating a request to associate the first playback device with at least a second playback device (e.g., a portable, NMD-equipped playback device). In practice, the first playback device may identify the trigger event in a variety of manners, such as by the first playback device detecting a voice or other input (e.g., a physical or software button press, an accelerometer measurement above a certain threshold, etc.) indicating the request to associate the first playback device with at least the second playback device. As noted above, there are various associations that can be defined between two or more playback devices. As such, the request to associate the first and second playback devices may take a variety of forms, such as a request to have the second playback device join the media playback system that the first playback device is already a member of or to transfer music playing at one playback device to the other playback device, among other examples.

As one illustrative example, Nick may have a media playback system set up at his house that includes a first playback device that is a stationary, NMD-equipped playback device that is located in Nick's living room. From time to time, Nick may take to the park a second playback device that is a portable, NMD-equipped playback device. Upon returning from the park to his house with his second playback device, Nick may speak a command to the first playback device for a group to be formed that includes the first and second playback devices. Based on receiving Nick's voice input, the first playback device may identify a trigger event indicating a request to associate the first and second playback devices.

In any case, based on the first playback device identifying the trigger event, it may then create a first sound code (e.g., a sound hash or "fingerprint") from a first sound specimen detected by a microphone of the first playback device. In example implementations, the first playback device may generate the first sound code from a sound specimen in a buffer of the first playback device, which may be a buffer typically used to perform wake-word identification or another buffer.

In general, a sound code provides a representation of one or more features of a sound specimen (e.g., perceptual features), such as frequency bands, bandwidth, prominent tones, decibel levels, etc. In this respect, a sound code may take a variety of forms. For instance, a sound code may be an alphabetic, a numeric, or an alpha-numeric sequence of characters that represent the one or more features of the sound specimen. In some instances, a sound code may be or otherwise include a sound hash. Other example forms of a sound code are also possible.

In operation, the first playback device may create the first sound code by applying one or more sound-code algorithms to the sound specimen detected by a microphone of the first playback device or to data that is indicative of one or more features of that sound specimen. A sound-code algorithm may generally take as input a sound specimen, or data indicative of features thereof, map the input to one or more code values of fixed sizes, and output a sound code indicative of those values. In practice, a sound-code algorithm can take a variety of forms. As one example, the sound-code algorithm may take the form of a sound-hash algorithm that may map spectral features of a spectrogram or some other representation of the sound specimen and output a sound hash indicative of that mapping. Additionally, or alternatively, the sound-code algorithm may take the form of a locality-sensitive sound-code algorithm that maps similar inputs (i.e., a range of input data values) to the same output sound code. Other examples of sound-code algorithms are also possible.

In some instances, prior to creating the first sound code, the first playback device may not be playing back audio. In some such instances, after identifying the trigger event, the first playback device may first cause itself (or alternatively, another playback device that may have an association with the first playback device) to start playing back audio and then create the first sound code that is representative of the played back audio (e.g., an audio hash). In other such instances, the first playback device may determine that another playback device is playing back audio and then decide to generate the first sound code despite the first playback device itself not playing back audio. In this respect, playback devices may create more accurate sound codes when only a single, nearby playback device is rendering audio compared to when multiple, nearby playback devices are rendering audio. In yet other instances, even if no playback device is currently rendering audio, the first playback device may nevertheless create the first sound code, which may be representative of other ambient noises in the first playback device's environment.

Returning to the above example, when Nick arrived back at his house, his media playback system may have been off or otherwise not playing back any music. After Nick's first playback device identifies the trigger event, the first playback device may cause itself to play a tone or the like, use its microphone to obtain an audio specimen comprising a portion of the played back music, and then generate a first audio hash based on the obtained audio specimen.

After identifying the trigger event, the first playback device may receive from the second playback device a sound object. In practice, this sound object may take the form of a sound specimen comprising sound detected by the second playback device, data indicative of certain features of the sound specimen (e.g., gain and/or spectral features), and/or a sound code (e.g., a sound hash) created by the second playback device based on the sound specimen. In some implementations, the first playback device may receive the sound object in response to the first playback device sending to the second playback device a request for it to provide a sound object. In other implementations, the second playback device may receive a different trigger (e.g., an input at the second playback device) that causes it to send the sound object to the first playback device. Other possibilities also exist.

Back to the previous example, when Nick returned to his house, he may have left his second playback device next to this front door. After Nick's first playback device identified the trigger event, it may have responsively sent to the second playback device a command for the second playback device to send it an audio object. In turn, Nick's second playback device located at his front door may use its microphone to obtain an audio specimen comprising a portion of the music being played back by the first playback device located in Nick's living room, create a second audio hash based on the obtained audio specimen, and then send that second audio hash as its sound object to the first playback device.

After receiving the sound object, the first playback device may then identify a second sound code, which it may do in a number of manners depending on the form of the sound object that it received. For example, if the sound object is a sound specimen detected by the second playback device, then the first playback device may identify the second sound code by creating the second sound code based on the sound specimen from the second playback device. As another example, if the sound object is or otherwise includes the second sound code, then the first playback device may identify the second sound code by receiving and processing the sound object. Other possibilities also exist, some of which are described in greater detail below.

Continuing with the above example, Nick's second playback device already created a second audio hash and provided it to the first playback device. Accordingly, the first playback device identifies the second sound code upon receiving the sound object from the second playback device.

In practice, the first playback device may receive sound objects and subsequently identify sound codes related thereto for multiple playback devices. In this respect, in some implementations, the first playback device may be configured to perform these functions for any other NMD-equipped playback device that is communicatively coupled to the first playback device (e.g., via a local communication network, such as a home WiFi network or a Bluetooth connection) and/or that is registered as a member of the same media playback system as the first playback device.

In any event, based at least on the first and the second sound codes, the first playback device may determine whether the first and second playback devices have a spatial relationship. In example implementations, playback devices are deemed to have a spatial relationship when the sound codes indicate that the playback devices are located within a threshold proximity of one another (e.g., within one foot, within one meter, etc.) or that they are located in the same area (e.g., in a particular room or in adjacent rooms) or the same environment (e.g., in the same house). In other words, the first playback device may infer from the sound codes that the playback devices have a spatial relationship.

Notably, the first playback device being configured with this functionality may be advantageous over existing systems because the spatial relationship determination can be performed locally at the media playback system without leveraging a cloud-server or the like, which may not always be available to the media playback system due to network connectivity, etc. Furthermore, the first playback device being configured with this functionality may be advantageous over existing systems because the spatial relationship determination is performed quicker since it is being done locally (i.e., where the sound forming the basis for the determination is detected) and does not require round-trip network communications with a cloud-server or the like. Yet another advantage may be that the spatial relationship determination is initiated by a trigger event that is relatively simple and convenient for the user to invoke. For example, in some instances, the user may initiate the determination using a voice command rather than by opening and navigating within an application on a controller device. Other advantages may also exist and not every embodiment need exhibit the foregoing advantages.

In any case, the first playback device may determine whether the first and second playback devices have a spatial relationship in a variety of manners, which may depend on the nature of the sound codes. As one possibility, the first playback device may determine whether a spatial relationship exists by determining whether the first and second sound codes are considered to "match" one another (i.e., if the codes are the same or substantially similar). If so, the first playback device determines that a spatial relationship does exist. Otherwise, the first playback device determines that such a relationship does not exist. As another possibility, the first playback device may determine that a spatial relationship exists when one or more differences between the first and second sound codes are within respective thresholds. Other possibilities also exist. Returning to the illustrative example, Nick's first playback device may determine that the first and second audio hashes are the same, thereby indicating that the first and second playback devices have a spatial relationship, which may be that they are positioned within the same physical room in Nick's house (e.g., Nick's front door might open into Nick's living room).

In some example implementations, before the first playback device determines whether the first and second playback devices have a spatial relationship, the first playback device may be configured to determine whether the first and second sound codes are representative of sound specimens obtained at the same point in time or around the same point in time. If the first playback device determines that there is a temporal misalignment, which may occur because of network and/or processing latency that exist between the first and second playback devices, the first playback device may adjust a timeframe related to the sound object that it received from the second playback device such that it is temporally aligned with a timeframe related to the first playback device's sound object. This functionality may promote a more accurate determination of whether a spatial relationship exists between the first and second playback devices.

In practice, the first playback device may determine whether the first and second sound codes are representative of sound specimens obtained at the same point in time or around the same point in time in a variety of manners. As one possibility, each playback device may be configured to apply a time indicator (e.g., a timestamp) to its sound objects that identifies when the sound object was obtained (e.g., in the case of a sound-specimen sound object) or generated (e.g., in the case of a sound-specimen sound code). Before analyzing the sound codes to determine whether a spatial relationship exists, the first playback device may utilize time indicators related to the sound codes to ensure that the sound codes correspond to sound specimens that were detected at or around the same point in time and to facilitate adjusting one or more timeframes if necessary.

In some implementations, the time indicators may be based on a system clock that is common to all of the playback devices in the media playback system, and so, determining whether a timeframe adjustment is needed may involve comparing time indicators. However, in other implementations, a given time indicator may be based on the device clock of the particular playback device that obtains a sound specimen or generates a sound code. As such, a first time indicator may be based on, for example, a clock of the first playback device, while a second time indicator may be based on, for example, a clock of the second playback device. In operation, these different device clocks generally are not aligned, and so, if the first and second playback devices generate respective time indicators at the same point in time, the respective values (i.e., clock readings) for these time indicators may differ. To help with this technical problem, the first and second playback devices may exchange clock-time information (e.g., via NTP packet exchanges) to facilitate determining a clock-time differential between their respective clocks. In practice, the first playback device may utilize this clock-time differential, along with the time indicator related to the second playback device's sound object, to facilitate determining whether there is a temporal misalignment, and if so, temporally align the second playback device's sound object with the first playback device's sound object.

The first playback device may determine whether the first and second sound codes are representative of sound specimens obtained at the same point in time or around the same point in time in other manners as well, some of which are discussed below.

In any case, based on the first playback device determining that a spatial relationship does in fact exist, the first playback device may cause the first and second playback devices to be associated in accordance with the request indicated by the initial trigger event. In line with the above discussion, the requested association may take a variety of forms, and so, the first playback device may cause the first and second playback devices to be associated in a variety of manners. For instance, returning to the above example, Nick's first playback device may facilitate the second playback device joining the first playback device's playback group, after which the two playback devices can render music in synchrony. In example implementations, after the first and second playback devices are associated, at least one of the devices (e.g., the first playback device) may provide some indication of the successful association, such as outputting a particular tone or the like to the user.

In some cases, the first playback device may determine that no spatial relationship exists between the first and second playback devices. As a result, the first playback device may determine that the second playback device cannot be associated with the first playback device at that time and may then terminate the association process. For example, the requested association between the first and second playback device may be to bond the second playback device with the first playback device so that the second playback device serves as a surround sound speaker. For such an association, the first and second playback device may be required to have a spatial relationship in which the two playback devices are located within 10 feet of one another (which may be required for optimal sounding surround sound). Based on sound codes for both of the devices, the first playback device may determine that such a spatial relationship does not exist (e.g., the first and second playback devices may be located on different floors of the house). Consequently, the first playback device may terminate the association process and may also provide some indication of the termination, such as by outputting a particular tone or the like to a user. Alternatively, if the first and second playback devices are within the requisite distance in this example (i.e., 10 feet), the first and second playback devices may be bonded, such as in a manner described in greater in detail below. In one aspect, forming associations in conjunction with comparing sound codes of playback devices may facilitate setup processes over typical setup processes, which involve a user stepping through a series of screens on a separate controller device to add and/or associate a playback device in a media playback system. In a related aspect, the need to use a separate controller device during certain setup processes may be eliminated in some implementations.

Accordingly, example devices, systems, and methods disclosed herein may help optimize the process for associating multiple playback devices, which may be especially beneficial for associations involving portable playback devices.

While some embodiments described herein may refer to functions performed by given actors, such as "users" and/or other entities, it should be understood that this description is for purposes of explanation only. The claims should not be interpreted to require action by any such example actor unless explicitly required by the language of the claims themselves.

II. Example Operating Environment

Figure 1B:
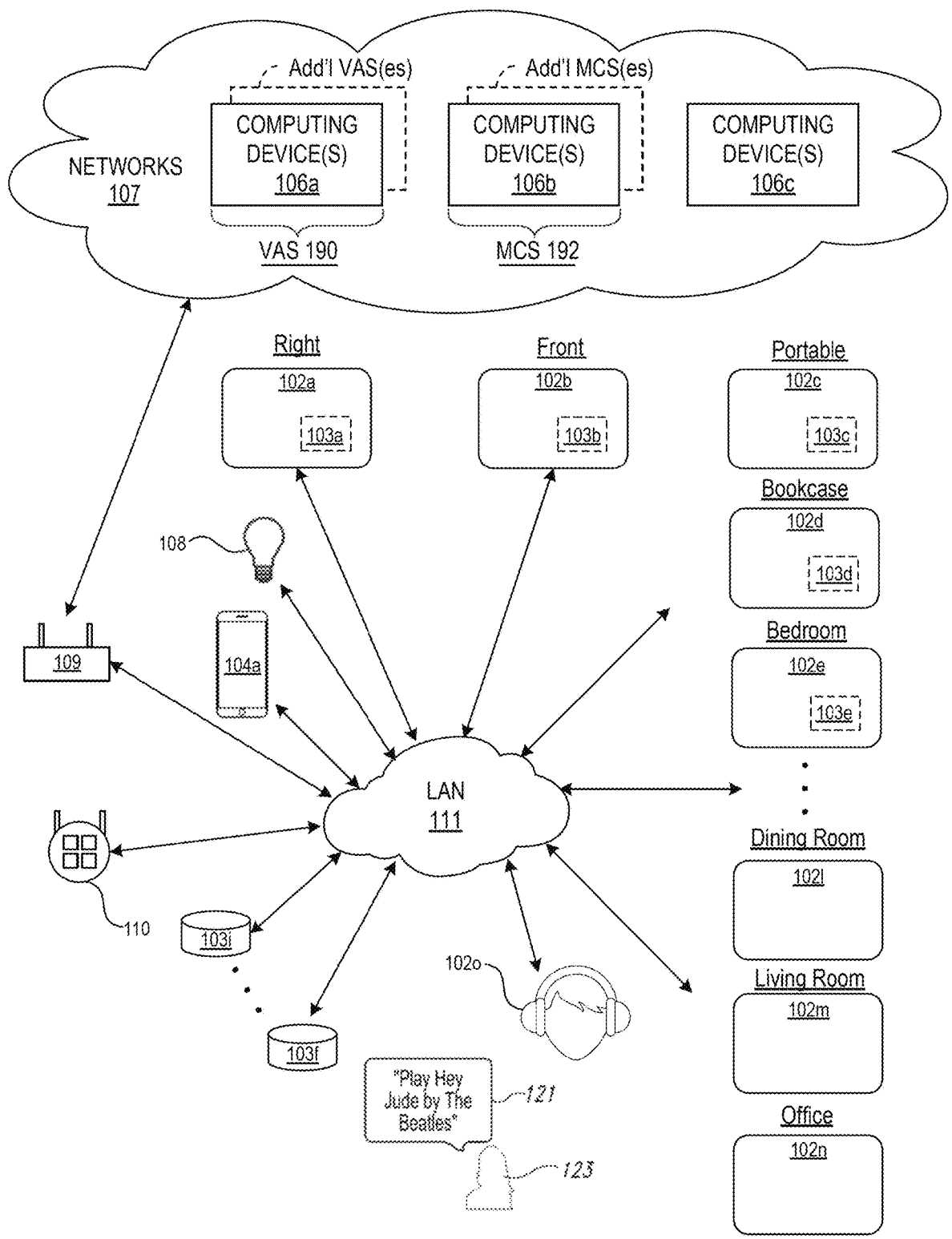
FIG. 1B is a schematic diagram of the media playback system of FIG. 1A and one or more networks.

FIGS. 1A and 1B illustrate an example configuration of a media playback system 100 (or "MPS 100") in which one or more embodiments disclosed herein may be implemented. Referring first to FIG. 1A, the MPS 100 as shown is associated with an example home environment having a plurality of rooms and spaces, which may be collectively referred to as a "home environment," "smart home," or "environment 101." The environment 101 comprises a household having several rooms, spaces, and/or playback zones, including a master bathroom 101*a*, a master bedroom 101*b* (referred to herein as "Nick's Room"), a second bedroom 101*c*, a family room or den 101*d*, an office 101*e*, a living room 101*f*, a dining room 101*g*, a kitchen 101*h*, and an outdoor patio 101*i*. While certain embodiments and examples are described below in the context of a home environment, the technologies described herein may be implemented in other types of environments. In some embodiments, for example, the MPS 100 can be implemented in one or more commercial settings (e.g., a restaurant, mall, airport, hotel, a retail or other store), one or more vehicles (e.g., a sports utility vehicle, bus, car, a ship, a boat, an airplane), multiple environments (e.g., a combination of home and vehicle environments), and/or another suitable environment where multi-zone audio may be desirable.

Within these rooms and spaces, the MPS 100 includes one or more computing devices. Referring to FIGS. 1A and 1B together, such computing devices can include playback devices 102 (identified individually as playback devices 102*a*-102*o*), network microphone devices 103 (identified individually as "NMDs" 103*a*-102*i*), and controller devices 104*a* and 104*b* (collectively "controller devices 104"). Referring to FIG. 1B, the home environment may include additional and/or other computing devices, including local network devices, such as one or more smart illumination devices 108 (FIG. 1B), a smart thermostat 110, and a local computing device 105 (FIG. 1A). In embodiments described below, one or more of the various playback devices 102 may be configured as portable playback devices, while others may be configured as stationary playback devices. For example, the headphones 102*o* (FIG. 1B) are a portable playback device, while the playback device 102*d* on the bookcase may be a stationary device. As another example, the playback device 102*c* on the Patio may be a battery-powered device, which may allow it to be transported to various areas within the environment 101, and outside of the environment 101, when it is not plugged in to a wall outlet or the like.

With reference still to FIG. 1B, the various playback, network microphone, and controller devices 102-104 and/or other network devices of the MPS 100 may be coupled to one another via point-to-point connections and/or over other connections, which may be wired and/or wireless, via a LAN 111 including a network router 109. For example, the playback device 102*j* in the Den 101*d* (FIG. 1A), which may be designated as the "Left" device, may have a point-to-point connection with the playback device 102*a*, which is also in the Den 101*d* and may be designated as the "Right" device. In a related embodiment, the Left playback device 102*j* may communicate with other network devices, such as the playback device 102*b*, which may be designated as the "Front" device, via a point-to-point connection and/or other connections via the LAN 111.

As further shown in FIG. 1B, the MPS 100 may be coupled to one or more remote computing devices 106 via a wide area network ("WAN") 107. In some embodiments, each remote computing device 106 may take the form of one or more cloud servers. The remote computing devices 106 may be configured to interact with computing devices in the environment 101 in various ways. For example, the remote computing devices 106 may be configured to facilitate streaming and/or controlling playback of media content, such as audio, in the home environment 101.

In some implementations, the various playback devices, NMDs, and/or controller devices 102-104 may be communicatively coupled to at least one remote computing device associated with a VAS and at least one remote computing device associated with a media content service ("MCS"). For instance, in the illustrated example of FIG. 1B, remote computing devices 106a are associated with a VAS 190 and remote computing devices 106b are associated with an MCS 192. Although only a single VAS 190 and a single MCS 192 are shown in the example of FIG. 1B for purposes of clarity, the MPS 100 may be coupled to multiple, different VASes and/or MCSes. In some implementations, VASes may be operated by one or more of AMAZON, GOOGLE, APPLE, MICROSOFT, SONOS or other voice assistant providers. In some implementations, MCSes may be operated by one or more of SPOTIFY, PANDORA, AMAZON MUSIC, or other media content services.

As further shown in FIG. 1B, the remote computing devices 106 further include remote computing device 106c configured to perform certain operations, such as remotely facilitating media playback functions, managing device and system status information, directing communications between the devices of the MPS 100 and one or multiple VASes and/or MCSes, among other operations. In one example, the remote computing devices 106c provide cloud servers for one or more SONOS Wireless HiFi Systems.

In various implementations, one or more of the playback devices 102 may take the form of or include an on-board (e.g., integrated) network microphone device. For example, the playback devices 102a-e include or are otherwise equipped with corresponding NMDs 103a-e, respectively. A playback device that includes or is equipped with an NMD may be referred to herein interchangeably as a playback device or an NMD unless indicated otherwise in the description. In some cases, one or more of the NMDs 103 may be a stand-alone device. For example, the NMDs 103f and 103g may be stand-alone devices. A stand-alone NMD may omit components and/or functionality that is typically included in a playback device, such as a speaker or related electronics. For instance, in such cases, a stand-alone NMD may not produce audio output or may produce limited audio output (e.g., relatively low-quality audio output).

The various playback and network microphone devices 102 and 103 of the MPS 100 may each be associated with a unique name, which may be assigned to the respective devices by a user, such as during setup of one or more of these devices. For instance, as shown in the illustrated example of FIG. 1B, a user may assign the name "Bookcase" to playback device 102d because it is physically situated on a bookcase. Similarly, the NMD 103f may be assigned the named "Island" because it is physically situated on an island countertop in the Kitchen 101h (FIG. 1A). Some playback devices may be assigned names according to a zone or room, such as the playback devices 102e, 102l, 102m, and 102n, which are named "Bedroom," "Dining Room," "Living Room," and "Office," respectively. Further, certain playback devices may have functionally descriptive names. For example, the playback devices 102a and 102b are assigned the names "Right" and "Front," respectively, because these two devices are configured to provide specific audio channels during media playback in the zone of the Den 101d (FIG. 1A). The playback device 102c in the Patio may be named portable because it is battery-powered and/or readily transportable to different areas of the environment 101. Other naming conventions are possible.

As discussed above, an NMD may detect and process sound from its environment, such as sound that includes background noise mixed with speech spoken by a person in the NMD's vicinity. For example, as sounds are detected by the NMD in the environment, the NMD may process the detected sound to determine if the sound includes speech that contains voice input intended for the NMD and ultimately a particular VAS. For example, the NMD may identify whether speech includes a wake word associated with a particular VAS.

In the illustrated example of FIG. 1B, the NMDs 103 are configured to interact with the VAS 190 over a network via the LAN 111 and the router 109. Interactions with the VAS 190 may be initiated, for example, when an NMD identifies in the detected sound a potential wake word. The identification causes a wake-word event, which in turn causes the NMD to begin transmitting detected-sound data to the VAS 190. In some implementations, the various local network devices 102-105 (FIG. 1A) and/or remote computing devices 106c of the MPS 100 may exchange various feedback, information, instructions, and/or related data with the remote computing devices associated with the selected VAS. Such exchanges may be related to or independent of transmitted messages containing voice inputs. In some embodiments, the remote computing device(s) and the media playback system 100 may exchange data via communication paths as described herein and/or using a metadata exchange channel as described in U.S. application Ser. No. 15/438,749 filed Feb. 21, 2017, and titled "Voice Control of a Media Playback System," which is herein incorporated by reference in its entirety.

Upon receiving the stream of sound data, the VAS 190 determines if there is voice input in the streamed data from the NMD, and if so the VAS 190 will also determine an underlying intent in the voice input. The VAS 190 may next transmit a response back to the MPS 100, which can include transmitting the response directly to the NMD that caused the wake-word event. The response is typically based on the intent that the VAS 190 determined was present in the voice input. As an example, in response to the VAS 190 receiving a voice input with an utterance to "Play Hey Jude by The Beatles," the VAS 190 may determine that the underlying intent of the voice input is to initiate playback and further determine that intent of the voice input is to play the particular song "Hey Jude." After these determinations, the VAS 190 may transmit a command to a particular MCS 192 to retrieve content (i.e., the song "Hey Jude"), and that MCS 192, in turn, provides (e.g., streams) this content directly to the MPS 100 or indirectly via the VAS 190. In some implementations, the VAS 190 may transmit to the MPS 100 a command that causes the MPS 100 itself to retrieve the content from the MCS 192.

In certain implementations, NMDs may facilitate arbitration amongst one another when voice input is identified in speech detected by two or more NMDs located within proximity of one another. For example, the NMD-equipped playback device 102d in the environment 101 (FIG. 1A) is in relatively close proximity to the NMD-equipped Living Room playback device 102m, and both devices 102d and 102*m* may at least sometimes detect the same sound. In such cases, this may require arbitration as to which device is ultimately responsible for providing detected-sound data to the remote VAS. Examples of arbitrating between NMDs may be found, for example, in previously referenced U.S. application Ser. No. 15/438,749.

In certain implementations, an NMD may be assigned to, or otherwise associated with, a designated or default playback device that may not include an NMD. For example, the Island NMD 103*f* in the Kitchen 101*h* (FIG. 1A) may be assigned to the Dining Room playback device 102*l*, which is in relatively close proximity to the Island NMD 103*f*. In practice, an NMD may direct an assigned playback device to play audio in response to a remote VAS receiving a voice input from the NMD to play the audio, which the NMD might have sent to the VAS in response to a user speaking a command to play a certain song, album, playlist, etc. Additional details regarding assigning NMDs and playback devices as designated or default devices may be found, for example, in previously referenced U.S. patent application Ser. No. 15/438,749.

Further aspects relating to the different components of the example MPS 100 and how the different components may interact to provide a user with a media experience may be found in the following sections. While discussions herein may generally refer to the example MPS 100, technologies described herein are not limited to applications within, among other things, the home environment described above. For instance, the technologies described herein may be useful in other home environment configurations comprising more or fewer of any of the playback, network microphone, and/or controller devices 102-104. For example, the technologies herein may be utilized within an environment having a single playback device 102 and/or a single NMD 103. In some examples of such cases, the LAN 111 (FIG. 1B) may be eliminated and the single playback device 102 and/or the single NMD 103 may communicate directly with the remote computing devices 106*a-d*. In some embodiments, a telecommunication network (e.g., an LTE network, a 5G network, etc.) may communicate with the various playback, network microphone, and/or controller devices 102-104 independent of a LAN.

a. Example Playback & Network Microphone Devices

Figure 2A:
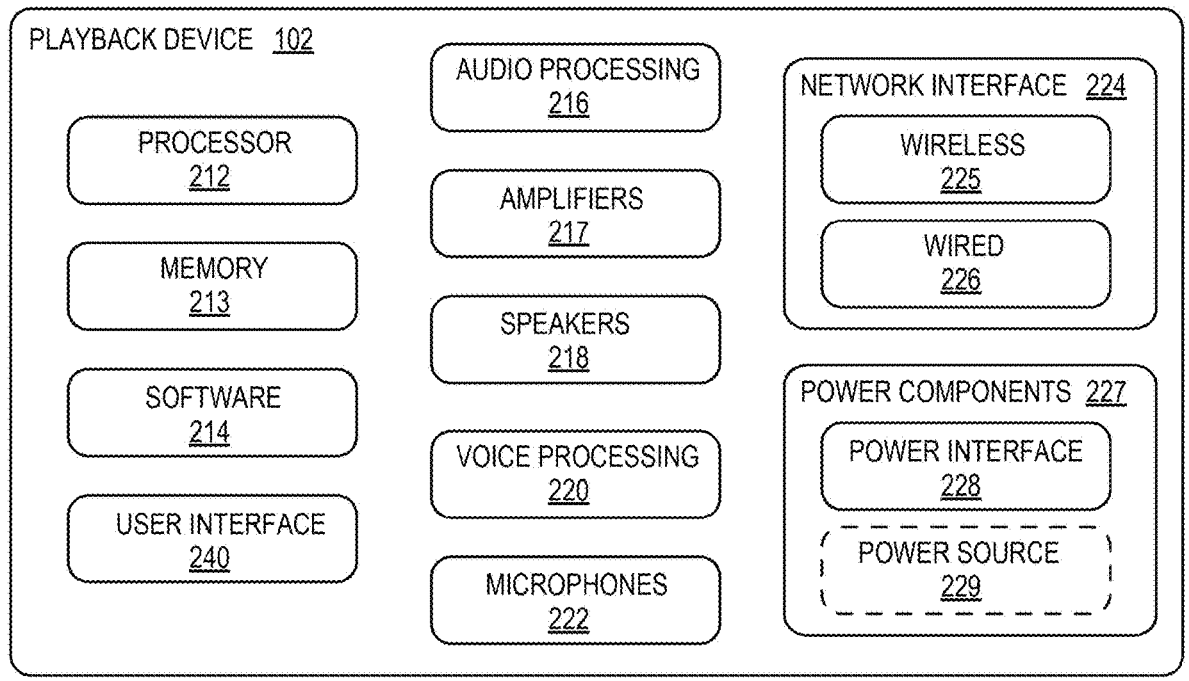
FIG. 2A is a functional block diagram of an example playback device.

FIG. 2A is a functional block diagram illustrating certain aspects of one of the playback devices 102 of the MPS 100 of FIGS. 1A and 1B. As shown, the playback device 102 includes various components, each of which is discussed in further detail below, and the various components of the playback device 102 may be operably coupled to one another via a system bus, communication network, or some other connection mechanism. In the illustrated example of FIG. 2A, the playback device 102 may be referred to as an "NMD-equipped" playback device because it includes components that support the functionality of an NMD, such as one of the NMDs 103 shown in FIG. 1A.

As shown, the playback device 102 includes at least one processor 212, which may be a clock-driven computing component configured to process input data according to instructions stored in memory 213. The memory 213 may be a tangible, non-transitory, computer-readable medium configured to store instructions that are executable by the processor 212. For example, the memory 213 may be data storage that can be loaded with software code 214 that is executable by the processor 212 to achieve certain functions.

In one example, these functions may involve the playback device 102 retrieving audio data from an audio source, which may be another playback device. In another example, the functions may involve the playback device 102 sending audio data, detected-sound data (e.g., corresponding to a voice input), and/or other information to another device on a network via at least one network interface 224. In yet another example, the functions may involve the playback device 102 causing one or more other playback devices to synchronously playback audio with the playback device 102. In yet a further example, the functions may involve the playback device 102 facilitating being paired or otherwise bonded with one or more other playback devices to create a multi-channel audio environment. Numerous other example functions are possible, some of which are discussed below.

As just mentioned, certain functions may involve the playback device 102 synchronizing playback of audio content with one or more other playback devices. During synchronous playback, a listener may not perceive time-delay differences between playback of the audio content by the synchronized playback devices. U.S. Pat. No. 8,234,395 filed on Apr. 4, 2004, and titled "System and method for synchronizing operations among a plurality of independently clocked digital data processing devices," which is hereby incorporated by reference in its entirety, provides in more detail some examples for audio playback synchronization among playback devices.

To facilitate audio playback, the playback device 102 includes audio processing components 216 that are generally configured to process audio prior to the playback device 102 rendering the audio. In this respect, the audio processing components 216 may include one or more digital-to-analog converters ("DAC"), one or more audio preprocessing components, one or more audio enhancement components, one or more digital signal processors ("DSPs"), and so on. In some implementations, one or more of the audio processing components 216 may be a subcomponent of the processor 212. In operation, the audio processing components 216 receive analog and/or digital audio and process and/or otherwise intentionally alter the audio to produce audio signals for playback.

The produced audio signals may then be provided to one or more audio amplifiers 217 for amplification and playback through one or more speakers 218 operably coupled to the amplifiers 217. The audio amplifiers 217 may include components configured to amplify audio signals to a level for driving one or more of the speakers 218.

Each of the speakers 218 may include an individual transducer (e.g., a "driver") or the speakers 218 may include a complete speaker system involving an enclosure with one or more drivers. A particular driver of a speaker 218 may include, for example, a subwoofer (e.g., for low frequencies), a mid-range driver (e.g., for middle frequencies), and/or a tweeter (e.g., for high frequencies). In some cases, a transducer may be driven by an individual corresponding audio amplifier of the audio amplifiers 217. In some implementations, a playback device may not include the speakers 218, but instead may include a speaker interface for connecting the playback device to external speakers. In certain embodiments, a playback device may include neither the speakers 218 nor the audio amplifiers 217, but instead may include an audio interface (not shown) for connecting the playback device to an external audio amplifier or audio-visual receiver.

In addition to producing audio signals for playback by the playback device 102, the audio processing components 216 may be configured to process audio to be sent to one or more other playback devices, via the network interface 224, for playback. In example scenarios, audio content to be processed and/or played back by the playback device 102 may be received from an external source, such as via an audio line-in interface (e.g., an auto-detecting 3.5 mm audio line-in connection) of the playback device 102 (not shown) or via the network interface 224, as described below.

As shown, the at least one network interface 224, may take the form of one or more wireless interfaces 225 and/or one or more wired interfaces 226. A wireless interface may provide network interface functions for the playback device 102 to wirelessly communicate with other devices (e.g., other playback device(s), NMD(s), and/or controller device(s)) in accordance with a communication protocol (e.g., any wireless standard including IEEE 802.11a, 802.11b, 802.11g, 802.11n, 802.11ac, 802.15, 4G mobile communication standard, and so on). A wired interface may provide network interface functions for the playback device 102 to communicate over a wired connection with other devices in accordance with a communication protocol (e.g., IEEE 802.3). While the network interface 224 shown in FIG. 2A include both wired and wireless interfaces, the playback device 102 may in some implementations include only wireless interface(s) or only wired interface(s).

In general, the network interface 224 facilitates data flow between the playback device 102 and one or more other devices on a data network. For instance, the playback device 102 may be configured to receive audio content over the data network from one or more other playback devices, network devices within a LAN, and/or audio content sources over a WAN, such as the Internet. In one example, the audio content and other signals transmitted and received by the playback device 102 may be transmitted in the form of digital packet data comprising an Internet Protocol (IP)-based source address and IP-based destination addresses. In such a case, the network interface 224 may be configured to parse the digital packet data such that the data destined for the playback device 102 is properly received and processed by the playback device 102.

As shown in FIG. 2A, the playback device 102 also includes voice processing components 220 that are operably coupled to one or more microphones 222. The microphones 222 are configured to detect sound (i.e., acoustic waves) in the environment of the playback device 102, which is then provided to the voice processing components 220. More specifically, each microphone 222 is configured to detect sound and convert the sound into a digital or analog signal representative of the detected sound, which can then cause the voice processing component 220 to perform various functions based on the detected sound, as described in greater detail below. In one implementation, the microphones 222 are arranged as an array of microphones (e.g., an array of six microphones). In some implementations, the playback device 102 includes more than six microphones (e.g., eight microphones or twelve microphones) or fewer than six microphones (e.g., four microphones, two microphones, or a single microphones).

In operation, the voice-processing components 220 are generally configured to detect and process sound received via the microphones 222, identify potential voice input in the detected sound, and extract detected-sound data to enable a VAS, such as the VAS 190 (FIG. 1B), to process voice input identified in the detected-sound data. The voice processing components 220 may include one or more analog-to-digital converters, an acoustic echo canceller ("AEC"), a spatial processor (e.g., one or more multi-channel Wiener filters, one or more other filters, and/or one or more beam former components), one or more buffers (e.g., one or more circular buffers), one or more wake-word engines, one or more voice extractors, and/or one or more speech processing components (e.g., components configured to recognize a voice of a particular user or a particular set of users associated with a household), among other example voice processing components. In example implementations, the voice processing components 220 may include or otherwise take the form of one or more DSPs or one or more modules of a DSP. In this respect, certain voice processing components 220 may be configured with particular parameters (e.g., gain and/or spectral parameters) that may be modified or otherwise tuned to achieve particular functions. In some implementations, one or more of the voice processing components 220 may be a subcomponent of the processor 212.

In some implementations, the voice-processing components 220 may detect and store a user's voice profile, which may be associated with a user account of the MPS 100. For example, voice profiles may be stored as and/or compared to variables stored in a set of command information or data table. The voice profile may include aspects of the tone or frequency of a user's voice and/or other unique aspects of the user's voice, such as those described in previously-referenced U.S. patent application Ser. No. 15/438,749.

As further shown in FIG. 2A, the playback device 102 also includes power components 227. The power components 227 include at least an external power source interface 228, which may be coupled to a power source (not shown) via a power cable or the like that physically connects the playback device 102 to an electrical outlet or some other external power source. Other power components may include, for example, transformers, converters, and like components configured to format electrical power.

In some implementations, the power components 227 of the playback device 102 may additionally include an internal power source 229 (e.g., one or more batteries) configured to power the playback device 102 without a physical connection to an external power source. When equipped with the internal power source 229, the playback device 102 may operate independent of an external power source. In some such implementations, the external power source interface 228 may be configured to facilitate charging the internal power source 229. As discussed before, a playback device comprising an internal power source may be referred to herein as a "portable playback device." On the other hand, a playback device that operates using an external power source may be referred to herein as a "stationary playback device," although such a device may in fact be moved around a home or other environment.

The playback device 102 further includes a user interface 240 that may facilitate user interactions independent of or in conjunction with user interactions facilitated by one or more of the controller devices 104. In various embodiments, the user interface 240 includes one or more physical buttons and/or supports graphical interfaces provided on touch sensitive screen(s) and/or surface(s), among other possibilities, for a user to directly provide input. The user interface 240 may further include one or more of lights (e.g., LEDs) and the speakers to provide visual and/or audio feedback to a user.

Figure 2B:
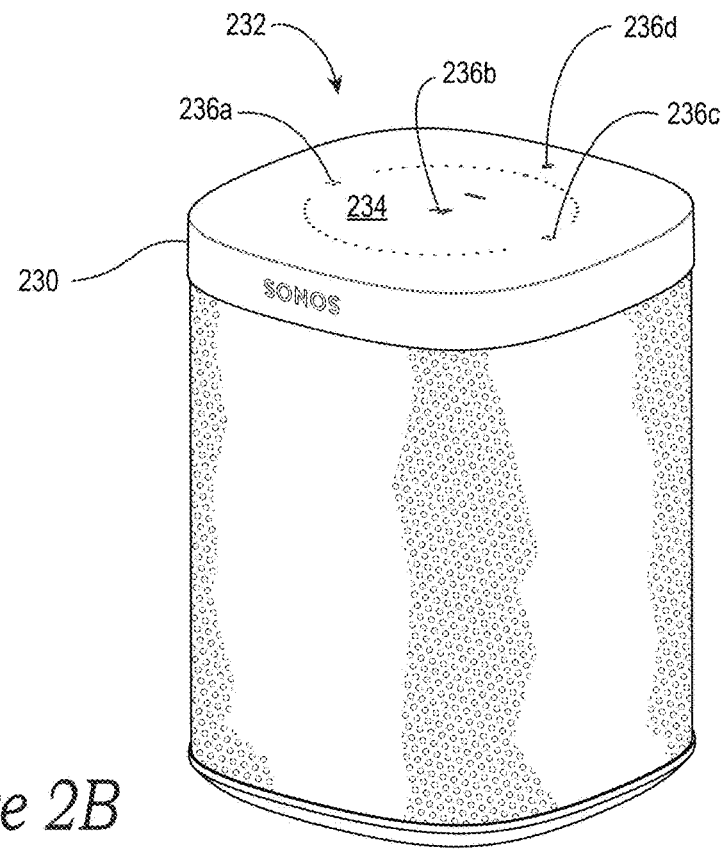
FIG. 2B is an isometric diagram of an example housing of the playback device of FIG. 2A.

As an illustrative example, FIG. 2B shows an example housing 230 of the playback device 102 that includes a user interface in the form of a control area 232 at a top portion 234 of the housing 230. The control area 232 includes buttons 236a-c for controlling audio playback, volume level, and other functions. The control area 232 also includes a button 236d for toggling the microphones 222 to either an on state or an off state.

As further shown in FIG. 2B, the control area 232 is at least partially surrounded by apertures formed in the top portion 234 of the housing 230 through which the microphones 222 (not visible in FIG. 2B) receive the sound in the environment of the playback device 102. The microphones 222 may be arranged in various positions along and/or within the top portion 234 or other areas of the housing 230 so as to detect sound from one or more directions relative to the playback device 102.

By way of illustration, SONOS, Inc. presently offers (or has offered) for sale certain playback devices that may implement certain of the embodiments disclosed herein, including a "PLAY:1," "PLAY:3," "PLAY:5," "PLAYBAR," "CONNECT:AMP," "PLAYBASE," "BEAM," "CONNECT," and "SUB." Any other past, present, and/or future playback devices may additionally or alternatively be used to implement the playback devices of example embodiments disclosed herein. Additionally, it should be understood that a playback device is not limited to the examples illustrated in FIG. 2A or 2B or to the SONOS product offerings. For example, a playback device may include, or otherwise take the form of, a wired or wireless headphone set, which may operate as a part of the media playback system 100 via a network interface or the like. In another example, a playback device may include or interact with a docking station for personal mobile media playback devices. In yet another example, a playback device may be integral to another device or component such as a television, a lighting fixture, or some other device for indoor or outdoor use.

b. Example Playback Device Configurations

FIGS. 3A-3E show example configurations of playback devices. Referring first to FIG. 3A, in some example instances, a single playback device may belong to a zone. For example, the playback device 102c (FIG. 1A) on the Patio may belong to Zone A. In some implementations described below, multiple playback devices may be "bonded" to form a "bonded pair," which together form a single zone. For example, the playback device 102f (FIG. 1A) named "Bed 1" in FIG. 3A may be bonded to the playback device 102g (FIG. 1A) named "Bed 2" in FIG. 3A to form Zone B. Bonded playback devices may have different playback responsibilities (e.g., channel responsibilities). In another implementation described below, multiple playback devices may be merged to form a single zone. For example, the playback device 102d named "Bookcase" may be merged with the playback device 102m named "Living Room" to form a single Zone C. The merged playback devices 102d and 102m may not be specifically assigned different playback responsibilities. That is, the merged playback devices 102d and 102m may, aside from playing audio content in synchrony, each play audio content as they would if they were not merged.

For purposes of control, each zone in the MPS 100 may be represented as a single user interface ("UI") entity. For example, as displayed by the controller devices 104, Zone A may be provided as a single entity named "Portable," Zone B may be provided as a single entity named "Stereo," and Zone C may be provided as a single entity named "Living Room."

In various embodiments, a zone may take on the name of one of the playback devices belonging to the zone. For example, Zone C may take on the name of the Living Room device 102m (as shown). In another example, Zone C may instead take on the name of the Bookcase device 102d. In a further example, Zone C may take on a name that is some combination of the Bookcase device 102d and Living Room device 102m. The name that is chosen may be selected by a user via inputs at a controller device 104. In some embodiments, a zone may be given a name that is different than the device(s) belonging to the zone. For example, Zone B in FIG. 3A is named "Stereo" but none of the devices in Zone B have this name. In one aspect, Zone B is a single UI entity representing a single device named "Stereo," composed of constituent devices "Bed 1" and "Bed 2." In one implementation, the Bed 1 device may be playback device 102f in the master bedroom 101h (FIG. 1A) and the Bed 2 device may be the playback device 102g also in the master bedroom 101h (FIG. 1A).

As noted above, playback devices that are bonded may have different playback responsibilities, such as playback responsibilities for certain audio channels. For example, as shown in FIG. 3B, the Bed 1 and Bed 2 devices 102f and 102g may be bonded so as to produce or enhance a stereo effect of audio content. In this example, the Bed 1 playback device 102f may be configured to play a left channel audio component, while the Bed 2 playback device 102g may be configured to play a right channel audio component. In some implementations, such stereo bonding may be referred to as "pairing."

Additionally, playback devices that are configured to be bonded may have additional and/or different respective speaker drivers. As shown in FIG. 3C, the playback device 102b named "Front" may be bonded with the playback device 102k named "SUB." The Front device 102b may render a range of mid to high frequencies, and the SUB device 102k may render low frequencies as, for example, a subwoofer. When unbonded, the Front device 102b may be configured to render a full range of frequencies. As another example, FIG. 3D shows the Front and SUB devices 102b and 102k further bonded with Right and Left playback devices 102a and 102j, respectively. In some implementations, the Right and Left devices 102a and 102j may form surround or "satellite" channels of a home theater system. The bonded playback devices 102a, 102b, 102j, and 102k may form a single Zone D (FIG. 3A).

In some implementations, playback devices may also be "merged." In contrast to certain bonded playback devices, playback devices that are merged may not have assigned playback responsibilities but may each render the full range of audio content that each respective playback device is capable of. Nevertheless, merged devices may be represented as a single UI entity (i.e., a zone, as discussed above). For instance, FIG. 3E shows the playback devices 102d and 102m in the Living Room merged, which would result in these devices being represented by the single UI entity of Zone C. In one embodiment, the playback devices 102d and 102m may playback audio in synchrony, during which each outputs the full range of audio content that each respective playback device 102d and 102m is capable of rendering.

In some embodiments, a stand-alone NMD may be in a zone by itself. For example, the NMD 103h from FIG. 1A is named "Closet" and forms Zone I in FIG. 3A. An NMD may also be bonded or merged with another device so as to form a zone. For example, the NMD device 103f named "Island" may be bonded with the playback device 102i Kitchen, which together form Zone F, which is also named "Kitchen." Additional details regarding assigning NMDs and playback devices as designated or default devices may be found, for example, in previously referenced U.S. patent application Ser. No. 15/438,749. In some embodiments, a stand-alone NMD may not be assigned to a zone.

Zones of individual, bonded, and/or merged devices may be arranged to form a set of playback devices that playback audio in synchrony. Such a set of playback devices may be referred to as a "group," "zone group," "synchrony group," or "playback group." In response to inputs provided via a controller device 104, playback devices may be dynamically grouped and ungrouped to form new or different groups that synchronously play back audio content. For example, referring to FIG. 3A, Zone A may be grouped with Zone B to form a zone group that includes the playback devices of the two zones. As another example, Zone A may be grouped with one or more other Zones C-I. The Zones A-I may be grouped and ungrouped in numerous ways. For example, three, four, five, or more (e.g., all) of the Zones A-I may be grouped. When grouped, the zones of individual and/or bonded playback devices may play back audio in synchrony with one another, as described in previously referenced U.S. Pat. No. 8,234,395. Grouped and bonded devices are example types of associations between portable and stationary playback devices that may be caused in response to a trigger event, as discussed above and described in greater detail below.

In various implementations, the zones in an environment may be assigned a particular name, which may be the default name of a zone within a zone group or a combination of the names of the zones within a zone group, such as "Dining Room+Kitchen," as shown in FIG. 3A. In some embodiments, a zone group may be given a unique name selected by a user, such as "Nick's Room," as also shown in FIG. 3A. The name "Nick's Room" may be a name chosen by a user over a prior name for the zone group, such as the room name "Master Bedroom."

Referring back to FIG. 2A, certain data may be stored in the memory 213 as one or more state variables that are periodically updated and used to describe the state of a playback zone, the playback device(s), and/or a zone group associated therewith. The memory 213 may also include the data associated with the state of the other devices of the media playback system 100, which may be shared from time to time among the devices so that one or more of the devices have the most recent data associated with the system.

In some embodiments, the memory 213 of the playback device 102 may store instances of various variable types associated with the states. Variables instances may be stored with identifiers (e.g., tags) corresponding to type. For example, certain identifiers may be a first type "a1" to identify playback device(s) of a zone, a second type "b1" to identify playback device(s) that may be bonded in the zone, and a third type "c1" to identify a zone group to which the zone may belong. As a related example, in FIG. 1A, identifiers associated with the Patio may indicate that the Patio is the only playback device of a particular zone and not in a zone group. Identifiers associated with the Living Room may indicate that the Living Room is not grouped with other zones but includes bonded playback devices 102a, 102b, 102j, and 102k. Identifiers associated with the Dining Room may indicate that the Dining Room is part of Dining Room+Kitchen group and that devices 103f and 102i are bonded. Identifiers associated with the Kitchen may indicate the same or similar information by virtue of the Kitchen being part of the Dining Room+Kitchen zone group. Other example zone variables and identifiers are described below.

In yet another example, the MPS 100 may include variables or identifiers representing other associations of zones and zone groups, such as identifiers associated with Areas, as shown in FIG. 3A. An Area may involve a cluster of zone groups and/or zones not within a zone group. For instance, FIG. 3A shows a first area named "First Area" and a second area named "Second Area." The First Area includes zones and zone groups of the Patio, Den, Dining Room, Kitchen, and Bathroom. The Second Area includes zones and zone groups of the Bathroom, Nick's Room, Bedroom, and Living Room. In one aspect, an Area may be used to invoke a cluster of zone groups and/or zones that share one or more zones and/or zone groups of another cluster. In this respect, such an Area differs from a zone group, which does not share a zone with another zone group. Further examples of techniques for implementing Areas may be found, for example, in U.S. application Ser. No. 15/682,506 filed Aug. 21, 2017 and titled "Room Association Based on Name," and U.S. Pat. No. 8,483,853 filed Sep. 11, 2007, and titled "Controlling and manipulating groupings in a multi-zone media system." Each of these applications is incorporated herein by reference in its entirety. In some embodiments, the MPS 100 may not implement Areas, in which case the system may not store variables associated with Areas.

The memory 213 may be further configured to store other data. Such data may pertain to audio sources accessible by the playback device 102 or a playback queue that the playback device (or some other playback device(s)) may be associated with. In embodiments described below, the memory 213 is configured to store a set of command data for selecting a particular VAS when processing voice inputs.

During operation, one or more playback zones in the environment of FIG. 1A may each be playing different audio content. For instance, the user may be grilling in the Patio zone and listening to hip hop music being played by the playback device 102c, while another user may be preparing food in the Kitchen zone and listening to classical music being played by the playback device 102i. In another example, a playback zone may play the same audio content in synchrony with another playback zone. For instance, the user may be in the Office zone where the playback device 102n is playing the same hip-hop music that is being playing by playback device 102c in the Patio zone. In such a case, playback devices 102c and 102n may be playing the hip-hop in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the MPS 100 may be dynamically modified. As such, the MPS 100 may support numerous configurations. For example, if a user physically moves one or more playback devices to or from a zone, the MPS 100 may be reconfigured to accommodate the change(s). For instance, if the user physically moves the playback device 102c from the Patio zone to the Office zone, the Office zone may now include both the playback devices 102c and 102n. In some cases, the user may pair or group the moved playback device 102c with the Office zone and/or rename the players in the Office zone using, for example, one of the controller devices 104 and/or voice input. As another example, if one or more playback devices 102 are moved to a particular space in the home environment that is not already a playback zone, the moved playback device(s) may be renamed or associated with a playback zone for the particular space.

Further, different playback zones of the MPS 100 may be dynamically combined into zone groups or split up into individual playback zones. For example, the Dining Room zone and the Kitchen zone may be combined into a zone group for a dinner party such that playback devices 102i and 102l may render audio content in synchrony. As another example, bonded playback devices in the Den zone may be split into (i) a television zone and (ii) a separate listening zone. The television zone may include the Front playback device 102*b*. The listening zone may include the Right, Left, and SUB playback devices 102*a*, 102*j*, and 102*k*, which may be grouped, paired, or merged, as described above. Splitting the Den zone in such a manner may allow one user to listen to music in the listening zone in one area of the living room space, and another user to watch the television in another area of the living room space. In a related example, a user may utilize either of the NMD 103*a* or 103*b* (FIG. 1B) to control the Den zone before it is separated into the television zone and the listening zone. Once separated, the listening zone may be controlled, for example, by a user in the vicinity of the NMD 103*a*, and the television zone may be controlled, for example, by a user in the vicinity of the NMD 103*b*. As described above, however, any of the NMDs 103 may be configured to control the various playback and other devices of the MPS 100.

c. Example Controller Devices

FIG. 4A is a functional block diagram illustrating certain aspects of a selected one of the controller devices 104 of the MPS 100 of FIG. 1A. Such controller devices may also be referred to herein as a "control device" or "controller." The controller device shown in FIG. 4A may include components that are generally similar to certain components of the network devices described above, such as a processor 412, memory 413 storing program software 414, at least one network interface 424, and one or more microphones 422. In one example, a controller device may be a dedicated controller for the MPS 100. In another example, a controller device may be a network device on which media playback system controller application software may be installed, such as for example, an iPhone™, iPad™ or any other smart phone, tablet, or network device (e.g., a networked computer such as a PC or Mac™).

The memory 413 of the controller device 104 may be configured to store controller application software and other data associated with the MPS 100 and/or a user of the system 100. The memory 413 may be loaded with instructions in software 414 that are executable by the processor 412 to achieve certain functions, such as facilitating user access, control, and/or configuration of the MPS 100. The controller device 104 is configured to communicate with other network devices via the network interface 424, which may take the form of a wireless interface, as described above.

In one example, system information (e.g., such as a state variable) may be communicated between the controller device 104 and other devices via the network interface 424. For instance, the controller device 104 may receive playback zone and zone group configurations in the MPS 100 from a playback device, an NMD, or another network device. Likewise, the controller device 104 may transmit such system information to a playback device or another network device via the network interface 424. In some cases, the other network device may be another controller device.

The controller device 104 may also communicate playback device control commands, such as volume control and audio playback control, to a playback device via the network interface 424. As suggested above, changes to configurations of the MPS 100 may also be performed by a user using the controller device 104. The configuration changes may include adding/removing one or more playback devices to/from a zone, adding/removing one or more zones to/from a zone group, forming a bonded or merged player, separating one or more playback devices from a bonded or merged player, among others.

As shown in FIG. 4A, the controller device 104 also includes a user interface 440 that is generally configured to facilitate user access and control of the MPS 100. The user interface 440 may include a touch-screen display or other physical interface configured to provide various graphical controller interfaces, such as the controller interfaces 440*a* and 440*b* shown in FIGS. 4B and 4C. Referring to FIGS. 4B and 4C together, the controller interfaces 440*a* and 440*b* includes a playback control region 442, a playback zone region 443, a playback status region 444, a playback queue region 446, and a sources region 448. The user interface as shown is just one example of an interface that may be provided on a network device, such as the controller device shown in FIG. 4A, and accessed by users to control a media playback system, such as the MPS 100. Other user interfaces of varying formats, styles, and interactive sequences may alternatively be implemented on one or more network devices to provide comparable control access to a media playback system.

The playback control region 442 (FIG. 4B) may include selectable icons (e.g., by way of touch or by using a cursor) that, when selected, cause playback devices in a selected playback zone or zone group to play or pause, fast forward, rewind, skip to next, skip to previous, enter/exit shuffle mode, enter/exit repeat mode, enter/exit cross fade mode, etc. The playback control region 442 may also include selectable icons that, when selected, modify equalization settings and/or playback volume, among other possibilities.

The playback zone region 443 (FIG. 4C) may include representations of playback zones within the MPS 100. The playback zones regions 443 may also include a representation of zone groups, such as the Dining Room+Kitchen zone group, as shown. In some embodiments, the graphical representations of playback zones may be selectable to bring up additional selectable icons to manage or configure the playback zones in the MPS 100, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the MPS 100 to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface are also possible. The representations of playback zones in the playback zone region 443 (FIG. 4C) may be dynamically updated as playback zone or zone group configurations are modified.

The playback status region 444 (FIG. 4B) may include graphical representations of audio content that is presently being played, previously played, or scheduled to play next in the selected playback zone or zone group. The selected playback zone or zone group may be visually distinguished on a controller interface, such as within the playback zone region 443 and/or the playback status region 444. The graphical representations may include track title, artist name, album name, album year, track length, and/or other relevant information that may be useful for the user to know when controlling the MPS 100 via a controller interface.

The playback queue region 446 may include graphical representations of audio content in a playback queue associated with the selected playback zone or zone group. In some embodiments, each playback zone or zone group may be associated with a playback queue comprising information corresponding to zero or more audio items for playback by the playback zone or zone group. For instance, each audio item in the playback queue may comprise a uniform resource identifier (URI), a uniform resource locator (URL), or some other identifier that may be used by a playback device in the playback zone or zone group to find and/or retrieve the audio item from a local audio content source or a networked audio content source, which may then be played back by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streamed audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue or may be associated with a new playback queue that is empty or contains audio items from the playback queue associated with the established zone group before the established zone group was ungrouped. Similarly, the resulting second playback zone may be re-associated with the previous second playback queue or may be associated with a new playback queue that is empty or contains audio items from the playback queue associated with the established zone group before the established zone group was ungrouped. Other examples are also possible.

With reference still to FIGS. 4B and 4C, the graphical representations of audio content in the playback queue region 446 (FIG. 4B) may include track titles, artist names, track lengths, and/or other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device. Playback of such a playback queue may involve one or more playback devices playing back media items of the queue, perhaps in sequential or random order.

The sources region 448 may include graphical representations of selectable audio content sources and/or selectable voice assistants associated with a corresponding VAS. The VASes may be selectively assigned. In some examples, multiple VASes, such as AMAZON's Alexa, MICROSOFT's Cortana, etc., may be invokable by the same NMD. In some embodiments, a user may assign a VAS exclusively to one or more NMDs. For example, a user may assign a first VAS to one or both of the NMDs 102a and 102b in the Living Room shown in FIG. 1A, and a second VAS to the NMD 103f in the Kitchen. Other examples are possible.

d. Example Audio Content Sources

The audio sources in the sources region 448 may be audio content sources from which audio content may be retrieved and played by the selected playback zone or zone group. One or more playback devices in a zone or zone group may be configured to retrieve for playback audio content (e.g., according to a corresponding URI or URL for the audio content) from a variety of available audio content sources. In one example, audio content may be retrieved by a playback device directly from a corresponding audio content source (e.g., via a line-in connection). In another example, audio content may be provided to a playback device over a network via one or more other playback devices or network devices. As described in greater detail below, in some embodiments audio content may be provided by one or more media content services.

Example audio content sources may include a memory of one or more playback devices in a media playback system such as the MPS 100 of FIG. 1, local music libraries on one or more network devices (e.g., a controller device, a network-enabled personal computer, or a networked-attached storage ("NAS")), streaming audio services providing audio content via the Internet (e.g., cloud-based music services), or audio sources connected to the media playback system via a line-in input connection on a playback device or network device, among other possibilities.

In some embodiments, audio content sources may be added or removed from a media playback system such as the MPS 100 of FIG. 1A. In one example, an indexing of audio items may be performed whenever one or more audio content sources are added, removed, or updated. Indexing of audio items may involve scanning for identifiable audio items in all folders/directories shared over a network accessible by playback devices in the media playback system and generating or updating an audio content database comprising metadata (e.g., title, artist, album, track length, among others) and other associated information, such as a URI or URL for each identifiable audio item found. Other examples for managing and maintaining audio content sources may also be possible.

e. Example Network Microphone Devices

Figure 5:
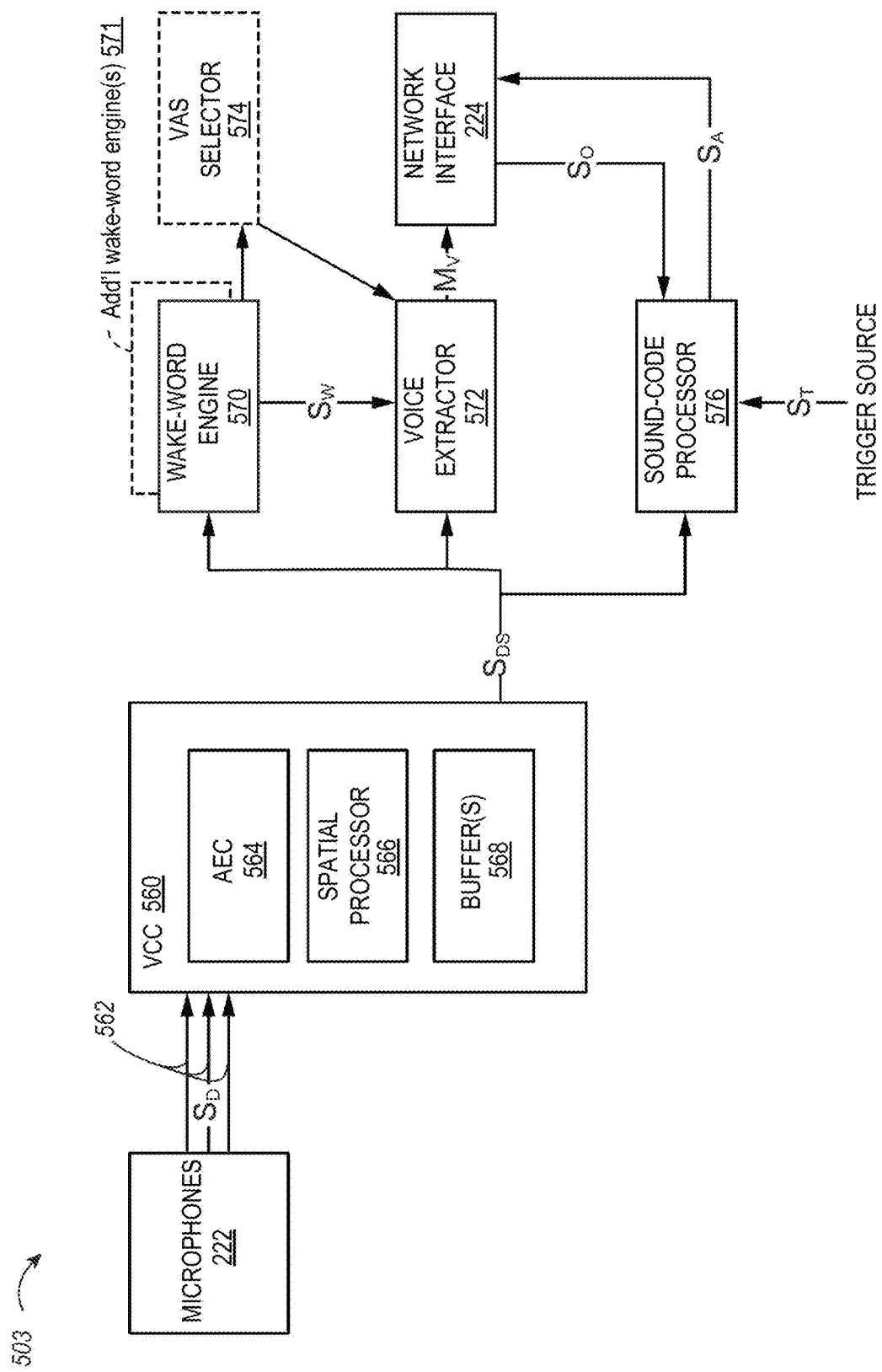
FIG. 5 is a functional block diagram of certain components of an example network microphone device in accordance with aspects of the disclosure.

FIG. 5 is a functional block diagram showing an NMD 503 configured in accordance with embodiments of the disclosure. The NMD 503 includes voice capture components ("VCC") 560, and at least one wake-word engine 570 and at least one voice extractor 572, each of which is operably coupled to the VCC 560. The NMD 503 further includes the microphones 222 and the at least one network interface 224 described above and may also include other components, such as audio amplifiers, speakers, a user interface, etc., which are not shown in FIG. 5 for purposes of clarity.

The microphones 222 of the NMD 503 are configured to provide detected sound, $S_D$, from the environment of the NMD 503 to the VCC 560. The detected sound $S_D$ may take the form of one or more analog or digital signals. In example implementations, the detected sound $S_D$ may be composed of a plurality signals associated with respective channels 562 that are fed to the VCC 560.

Each channel 562 may correspond to a particular microphone 222. For example, an NMD having six microphones may have six corresponding channels. Each channel of the detected sound $S_D$ may bear certain similarities to the other channels but may differ in certain regards, which may be due to the position of the given channel's corresponding microphone relative to the microphones of other channels. For example, one or more of the channels of the detected sound $S_D$ may have a greater signal to noise ratio ("SNR") of speech to background noise than other channels.

As further shown in FIG. 5, the VCC 560 includes an AEC 564, a spatial processor 566, and one or more buffers 568. In operation, the AEC 564 receives the detected sound $S_D$ and filters or otherwise processes the sound to suppress echoes and/or to otherwise improve the quality of the detected sound $S_D$. That processed sound may then be passed to the spatial processor 566.

The spatial processor 566 is typically configured to analyze the detected sound $S_D$ and identify certain characteristics, such as a sound's amplitude (e.g., decibel level), frequency spectrum, directionality, etc. In one respect, the spatial processor 566 may help filter or suppress ambient noise in the detected sound $S_D$ from potential user speech based on similarities and differences in the constituent channels 562 of the detected sound $S_D$, as discussed above. As one possibility, the spatial processor 566 may monitor metrics that distinguish speech from other sounds. Such metrics can include, for example, energy within the speech band relative to background noise and entropy within the speech band—a measure of spectral structure—which is typically lower in speech than in most common background noise. In some implementations, the spatial processor 566 may be configured to determine a speech presence probability, examples of such functionality are disclosed in U.S. patent application Ser. No. 15/984,073, filed May 18, 2018, titled "Linear Filtering for Noise-Suppressed Speech Detection," which is incorporated herein by reference in its entirety.

In operation, the one or more buffers 568—one or more of which may be part of or separate from the memory 213 (FIG. 2A)—capture data corresponding to the detected sound $S_D$. More specifically, the one or more buffers 568 capture detected-sound data that was processed by the upstream AEC 564 and spatial processor 566.

In general, the detected-sound data form a digital representation (i.e., sound-data stream), $S_{DS}$, of the sound detected by the microphones 222. In practice, the sound-data stream $S_{DS}$ may take a variety of forms. As one possibility, the sound-data stream $S_{DS}$ may be composed of frames, each of which may include one or more sound samples. The frames may be streamed (i.e., read out) from the one or more buffers 568 for further processing by downstream components, such as the wake-word engine 570 and the voice extractor 572 of the NMD 503.

In some implementations, at least one buffer 568 captures detected-sound data utilizing a sliding window approach in which a given amount (i.e., a given window) of the most recently captured detected-sound data is retained in the at least one buffer 568 while older detected-sound data are overwritten when they fall outside of the window. For example, at least one buffer 568 may temporarily retain 20 frames of a sound specimen at given time, discard the oldest frame after an expiration time, and then capture a new frame, which is added to the 19 prior frames of the sound specimen.

In practice, when the sound-data stream $S_{DS}$ is composed of frames, the frames may take a variety of forms having a variety of characteristics. As one possibility, the frames may take the form of audio frames that have a certain resolution (e.g., 16 bits of resolution), which may be based on a sampling rate (e.g., 44,100 Hz). Additionally, or alternatively, the frames may include information corresponding to a given sound specimen that the frames define, such as metadata that indicates frequency response, power input level, SNR, microphone channel identification, and/or other information of the given sound specimen, among other examples. Thus, in some embodiments, a frame may include a portion of sound (e.g., one or more samples of a given sound specimen) and metadata regarding the portion of sound. In other embodiments, a frame may only include a portion of sound (e.g., one or more samples of a given sound specimen) or metadata regarding a portion of sound.

In any case, downstream components of the NMD 503 may process the sound-data stream $S_{DS}$. For instance, the wake-word engine 570 is configured to apply or more identification algorithms to the sound-data stream $S_{DS}$ (e.g., streamed sound frames) to spot potential wake words in the detected-sound $S_D$. When the wake-word engine 570 spots a potential wake word, the work-word engine 570 provides an indication of a "wake-word event" (also referred to as a "wake-word trigger"). In the illustrated example of FIG. 5, the wake-word engine 570 outputs a signal, $S_W$, that indicates the occurrence of a wake-word event to the voice extractor 572.

In response to the wake-word event (e.g., in response to the signal $S_W$ indicating the wake-word event), the voice extractor 572 is configured to receive and format (e.g., packetize) the sound-data stream $S_{DS}$. For instance, the voice extractor 572 packetizes the frames of the sound-data stream $S_{DS}$ into messages. The voice extractor 572 transmits or streams these messages, $M_V$, that may contain voice input in real time or near real time to a remote VAS, such as the VAS 190 (FIG. 1B), via the network interface 224.

Figure 6A:
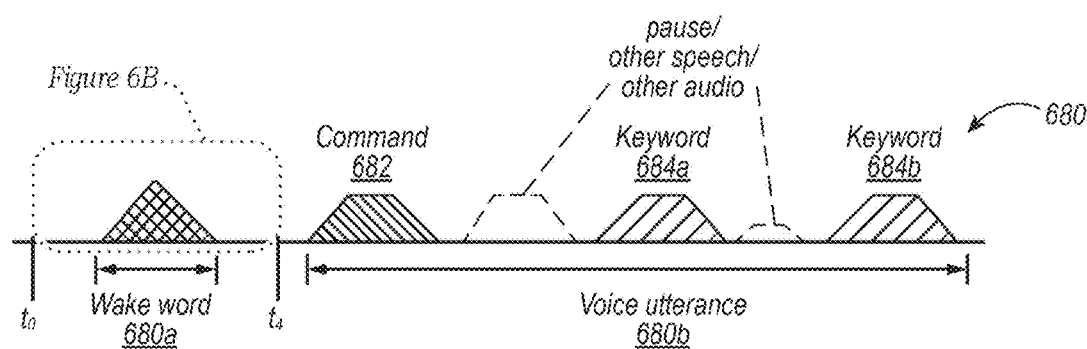
FIG. 6A is a diagram of an example voice input.

The VAS is configured to process the sound-data stream $S_{DS}$ contained in the messages $M_V$ sent from the NMD 503. More specifically, the VAS is configured to identify voice input based on the sound-data stream $S_{DS}$. Referring to FIG. 6A, a voice input 680 may include a wake-word portion 680a and an utterance portion 680b. The wake-word portion 680a corresponds to detected sound that caused the wake-word event. For instance, the wake-word portion 680a corresponds to detected sound that caused the wake-word engine 570 to output the wake-word event signal $S_W$ to the voice extractor 572. The utterance portion 680b corresponds to detected sound that potentially comprises a user request following the wake-word portion 680a.

Typically, the VAS may first process the wake-word portion 680a within the sound-data stream $S_{DS}$ to verify the presence of the wake word. In some instances, the VAS may determine that the wake-word portion 680a comprises a false wake word (e.g., the word "Election" when the word "Alexa" is the target wake word). In such an occurrence, the VAS may send a response to the NMD 503 (FIG. 5) with an indication for the NMD 503 to cease extraction of sound data, which may cause the voice extractor 572 to cease further streaming of the detected-sound data to the VAS. The wake-word engine 570 may resume or continue monitoring sound specimens until it spots another potential wake word, leading to another wake-word event. In some implementations, the VAS may not process or receive the wake-word portion 680a but instead processes only the utterance portion 680b.

In any case, the VAS processes the utterance portion 680b to identify the presence of any words in the detected-sound data and to determine an underlying intent from these words. The words may correspond to a certain command and certain keywords 684 (identified individually in FIG. 6A as a first keyword 684a and a second keyword 684b). A keyword may be, for example, a word in the voice input 680 identifying a particular device or group in the MPS 100. For instance, in the illustrated example, the keywords 684 may be one or more words identifying one or more zones in which the music is to be played, such as the Living Room and the Dining Room (FIG. 1A).

To determine the intent of the words, the VAS is typically in communication with one or more databases associated with the VAS (not shown) and/or one or more databases (not shown) of the MPS 100. Such databases may store various user data, analytics, catalogs, and other information for natural language processing and/or other processing. In some implementations, such databases may be updated for adaptive learning and feedback for a neural network based on voice-input processing. In some cases, the utterance portion 680b may include additional information, such as detected pauses (e.g., periods of non-speech) between words spoken by a user, as shown in FIG. 6A. The pauses may demarcate the locations of separate commands, keywords, or other information spoke by the user within the utterance portion 680b.

Based on certain command criteria, the VAS may take actions as a result of identifying one or more commands in the voice input, such as the command 682. Command criteria may be based on the inclusion of certain keywords within the voice input, among other possibilities. Additionally, or alternately, command criteria for commands may involve identification of one or more control-state and/or zone-state variables in conjunction with identification of one or more particular commands. Control-state variables may include, for example, indicators identifying a level of volume, a queue associated with one or more devices, and playback state, such as whether devices are playing a queue, paused, etc. Zone-state variables may include, for example, indicators identifying which, if any, zone players are grouped.

After processing the voice input, the VAS may send a response to the MPS 100 with an instruction to perform one or more actions based on an intent it determined from the voice input. For example, based on the voice input, the VAS may direct the MPS 100 to initiate playback on one or more of the playback devices 102, control one or more of these devices (e.g., raise/lower volume, group/ungroup devices, etc.), turn on/off certain smart devices, among other actions. After receiving the response from the VAS, the wake-word engine 570 of the NMD 503 may resume or continue to monitor the sound-data stream $S_{DS}$ until it spots another potential wake-word, as discussed above.

Referring back to FIG. 5, in multi-VAS implementations, the NMD 503 may include a VAS selector 574 (shown in dashed lines) that is generally configured to direct the voice extractor's extraction and transmission of the sound-data stream $S_{DS}$ to the appropriate VAS when a given wake-word is identified by a particular wake-word engine, such as the wake-word engine 570 and at least one additional wake-word engine 571 (shown in dashed lines). In such implementations, the NMD 503 may include multiple, different wake-word engines and/or voice extractors, each supported by a particular VAS. Similar to the discussion above, each wake-word engine may be configured to receive as input the sound-data stream $S_{DS}$ from the one or more buffers 568 and apply identification algorithms to cause a wake-word trigger for the appropriate VAS. Thus, as one example, the wake-word engine 570 may be configured to identify the wake word "Alexa" and cause the NMD 503 to invoke the AMAZON VAS when "Alexa" is spotted. As another example, the wake-word engine 571 may be configured to identify the wake word "Ok, Google" and cause the NMD 503 to invoke the GOOGLE VAS when "Ok, Google" is spotted. In single-VAS implementations, the VAS selector 574 may be omitted.

In additional or alternate implementations, the NMD 503 may include other voice-input identification engines (not shown in FIG. 5) that enable the NMD 503 to operate without the assistance of a remote VAS. As an example, such an engine may identify in detected sound certain commands (e.g., "play," "pause," "turn on," etc.) and/or certain keywords or phrases, such as the unique name assigned to a given playback device (e.g., "Bookcase," "Patio," "Office," etc.). In response to identifying one or more of these commands, keywords, and/or phrases, the NMD 503 may communicate a signal (not shown in FIG. 5) that causes the audio processing components 216 (FIG. 2A) to perform one or more actions. For instance, when a user says "Hey Sonos, stop the music in the office," the NMD 503 may communicate a signal to the office playback device 102n, either directly, or indirectly via one or more other devices of the MPS 100, which causes the office device 102n to stop audio playback. Reducing or eliminating the need for assistance from a remote VAS may reduce latency that might otherwise occur when processing voice input remotely. In some cases, the identification algorithms employed may be configured to identify commands that are spoken without a preceding wake word. For instance, in the example above, the NMD 503 may employ an identification algorithm that triggers an event to stop the music in the office without the user first saying "Hey Sonos" or another wake word.

As further shown in FIG. 5, the NMD 503 includes a sound-code processor 576 that is generally configured to (i) generate respective sound codes for playback devices, such as itself and/or other playback devices of the MPS 100, (ii) analyze sound codes for playback devices to determine whether any spatial relationships exists between two or more playback devices, and (iii) facilitate causing the NMD 503 to form one of various associations between two or more playback devices determined to have a spatial relationship. In some instances, the sound-code processor 576 facilitates causing the NMD 503 to form associations between portable and stationary playback devices, as discussed above. These and other functions of the sound-code processor 576 are discussed in further detail below.

III. Example Associations of Playback Devices Based on Sound Codes

As discussed above, there are various associations that can be defined between two or more playback devices of a media playback system, such as the MPS 100, and these associations may be changed over time. In the MPS 100, typically, associations between playback devices are defined in response to a user providing multiple inputs at a controller device 104. However, in some instances, it may be beneficial for a playback device of the MPS 100 to be able to determine whether any other playback device—that may have been previously removed from the home environment 101—is presently in proximity to the playback device and therefore, available for association with the playback device.

As noted before, example devices, systems, and methods disclosed herein provide an improvement to technologies currently used to associate playback devices. In this regard, at a high level, a playback device (e.g., a stationary playback device, such as the playback device 102d of FIG. 1A) is configured to determine whether a spatial relationship exists between itself and one or more other playback devices (e.g., one or more portable playback devices, such as the playback device 102c and the headphones 102o) based on sound codes for the playback device and the one or more other playback devices, which may then facilitate associating the playback device with the one or more other playback devices. This functionality may alleviate the need for a user to operate a controller device 104 in order to associate playback devices and/or may minimize a user's involvement in such procedures.

Figure 7A:
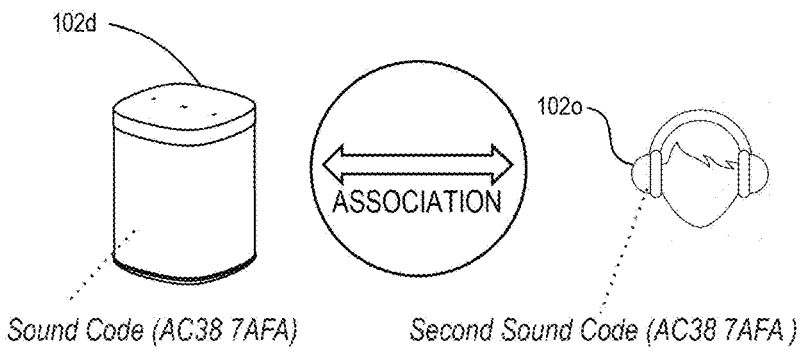
FIGS. 7A-7C are conceptual illustrations showing example use-case scenarios involving associations between playback devices in accordance with aspects of the disclosure.
Figure 7B:
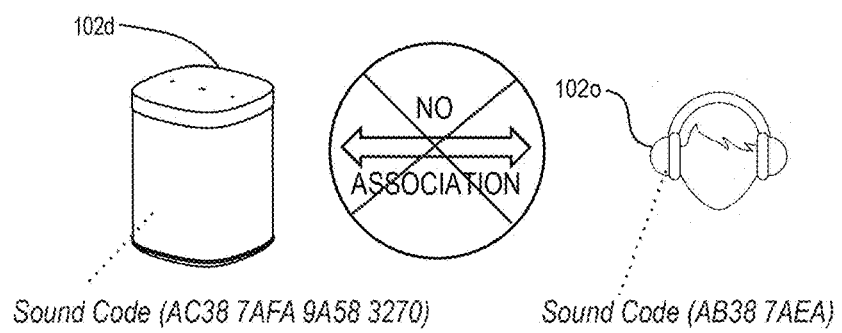
Figure 7C:
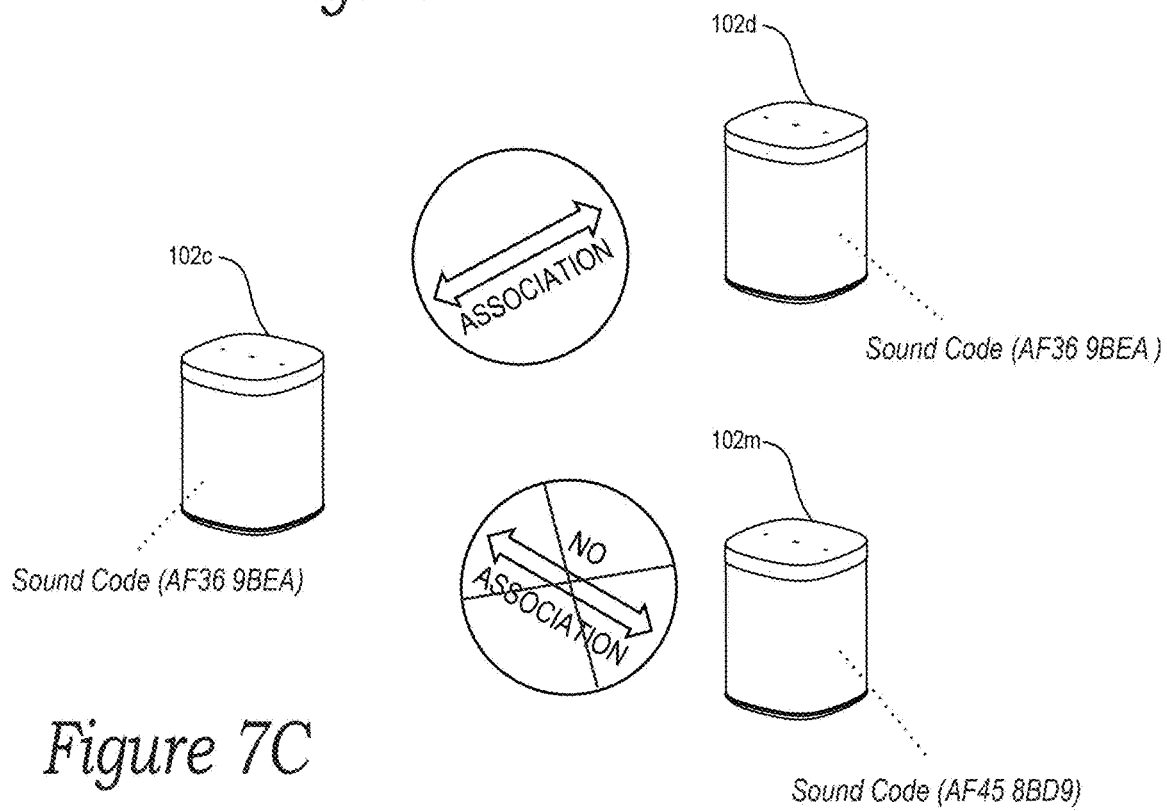

FIGS. 7A-7C provide example conceptual illustrations of use-case scenarios in which an NMD-equipped playback device 503 (e.g., the stationary playback device 102d of FIG. 1A or the portable playback device 102c) determines whether to form an association with another playback device. Referring first to FIG. 7A, the playback device 102d becomes associated with the headphones 102o after a user initiates a trigger event with the headphones 102o in the vicinity of the playback device 102d. As discussed below, the trigger event may take a variety of forms, but in one example, a voice input that causes a trigger event may be a user speaking the following command to the playback device 102d: "Alexa, transfer music to my headphones." In any case, as discussed in further detail below, in response to the trigger event, the playback device 102d compares a first sound code for itself and a second sound code for the headphones 102o. Based on the comparison, the playback device 102d determines that the first and second sound codes match and responsively facilitates forming an association between the playback device 102d and the headphones 102o, as illustrated in FIG. 7A.

FIG. 7B illustrates an alternative scenario. In particular, as shown, the playback device 102d does not become associated with the headphones 102o in response to the trigger event. In such a scenario, as discussed in further detail below, the headphones 102o may capture a sound specimen that yields a sound code that does not match the first sound code. This difference in sound codes may occur for a variety of reasons. For example, the headphones 102o may not be within sufficient proximity (i.e., the same sound environment) of the playback device 102d.

In yet another scenario, FIG. 7C shows an example in which the portable playback device 102c becomes associated with one playback device but not another playback device. In this example, the portable playback device 102c may have been brought from outside of the home environment 101 into the Living Room 101f. In response to a trigger event (e.g., a button press at the playback device 102c), the portable playback device 102c may compare sound codes for itself, the playback device 102d (also in the Living Room 101h), and the playback device 102m (also in the Living Room 101h). As shown in FIG. 7C, the portable playback device 102c becomes associated with the playback device 102d because their sound codes match one another but does not become associated with the playback device 102m because that device's sound code and the portable playback device 102c's sound code do not match.

Figure 8:
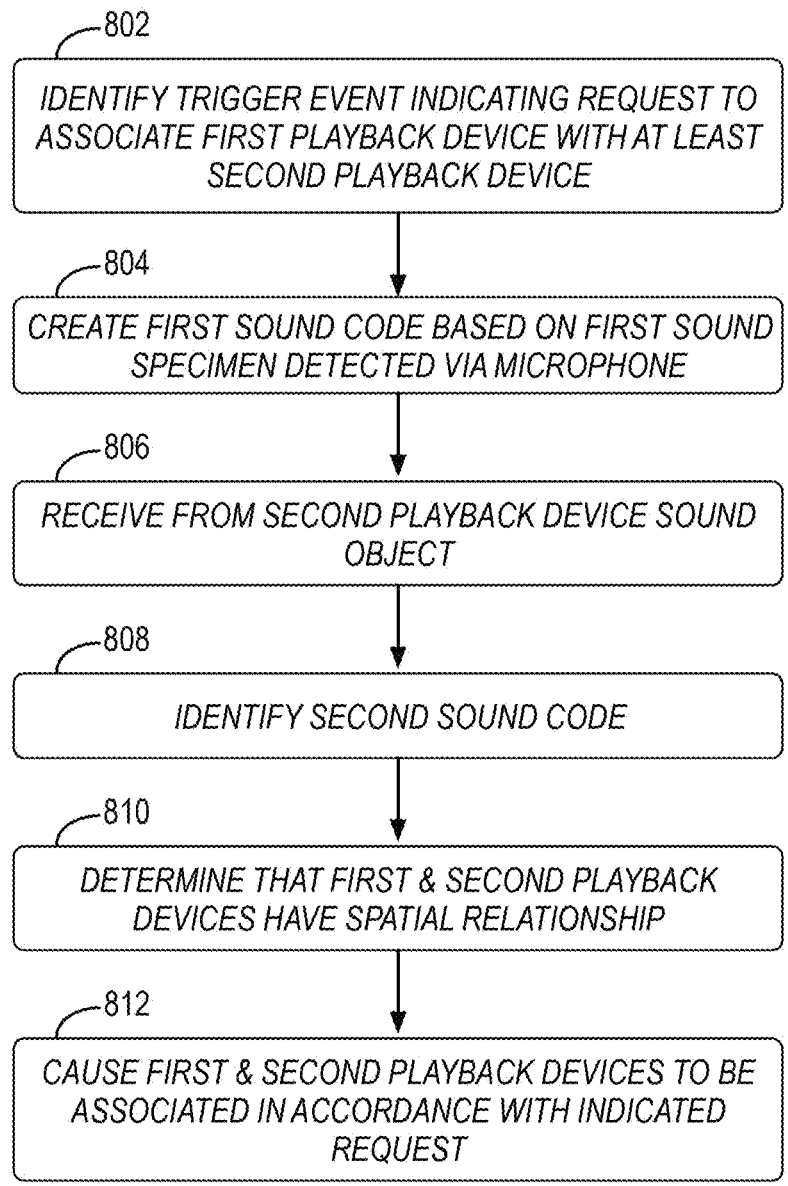
FIG. 8 is a flow diagram of an example method for associating playback devices based on sound codes in accordance with aspects of the disclosure.

Additional details regarding functions related to associating playback devices based on sound codes (e.g., as illustrated in FIGS. 7A-7C) will now be discussed. For purpose of illustration only, an example method 800 for associating playback devices based on sound codes is depicted in FIG. 8 and discussed below as being carried out by a playback device of the MPS 100 that is NMD-equipped (e.g., the playback device 102d). However, it should be understood that the method 800 is merely exemplary. For instance, one or more blocks shown in the flow diagram of FIG. 8 may be rearranged into different orders, combined into fewer blocks, separated into additional blocks, and/or removed altogether. Moreover, it should be understood that the playback device 102d performing the method 800 is also exemplary, and other playback devices, such as one that is not configured with an NMD 103 or a microphone, may also perform the method. It should further be understood that the method 800 could be performed by a device other than a playback device of the MPS 100, which may be part of a different type of system.

In line with the above discussion, the NMD-equipped playback device 102d may include at least the components illustrated in FIG. 5. In the example scenario discussed below, the playback device 102d is located in the Living Room 101f of FIG. 1A, and the playback device 102c is a portable playback device that is often removed from the home environment 101.

Turning now to FIG. 8, at block 802, the playback device 102d identifies a trigger event indicating a request to associate the playback device 102d with at least a second playback device, such as the playback device 102c. In some instances, the request may specifically identify the particular second playback device (e.g., the playback device 102c) that the playback device is to be associated with. In other instances, the request may generically request an association of any available, nearby playback devices with the playback device 102d. Other examples are also possible.

In practice, the playback device 102d may identify the trigger event indicating the requested association in a variety of manners. As one possibility, the playback device 102d may detect, via one or more of its microphones 222, a voice input indicating a request to associate the playback device 102d with at least the playback device 102c. The playback device 102d may capture the voice input and invoke an applicable VAS to interpret such a voice input in line with the above discussion.

As another possibility, the playback device 102d may detect, via a different input interface of the playback device 102d, a touch input indicating a request to associate the playback device 102d with at least the playback device 102c. For example, a physical or software button on the playback device 102d may receive a touch input corresponding to the requested association or an accelerometer of the playback device 102d may detect a measurement indicative of the requested association, among other examples.

As yet another possibility, the playback device 102d may receive, via the network interface 224, a message indicating a request to associate the playback device 102d with at least the playback device 102c. For example, the playback device 102c may identify a trigger event indicating a request to associate the playback device 102c with at least the playback device 102d (e.g., the playback device 102c may receive credentials for the local communication network to which the MPS 100 is connected during setup of the playback device 102c or upon bringing the playback device 102c back within range of the local communication network), and based on identifying that event, the playback device 102*c* may send the message over the LAN 111 to the playback device 102*d*.

In some implementations, the playback device 102*d* may receive the message indicating a request to associate the playback device 102*d* with at least the playback device 102*c* from a controller device 104, as a result of the controller device 104 receiving a single input. For example, the controller device 104 may detect that the playback device 102*c* has appeared on the same network as the controller device 104 (e.g., the LAN 111) and output a prompt to the user based thereon (e.g., a prompt asking if the user would like the playback device 102*c* to be associated with the playback device 102*d*). The user might then provide an input at the controller device 104 confirming or declining the prompt. The playback device 102*d* may identify the trigger event in other manners as well.

In any case, as noted above, there are various associations that can be defined between two or more playback devices. As such, the request to associate the playback device 102*d* and the playback device 102*c* may take a variety of forms.

As one possibility, at a point in time, the MPS 100 may comprise the playback device 102*d* (i.e., the playback device 102*d* has been setup or otherwise registered with the MPS 100), but the MPS 100 may not comprise the playback device 102*c*. The requested association may then be for the playback device 102*c* to join the MPS 100 (i.e., be setup or otherwise registered with the MPS 100), thereby associating the playback device 102*c* with at least the playback 102*d*.

As another possibility, the requested association may be for the playback device 102*d* and the playback device 102*c* to be arranged in accordance with any of the above-mentioned device configurations, such as a playback group, bonded pair, merged zone, an Area, etc.

As yet another possibility, the playback device 102*d* may be playing back audio, and the requested association may be for that audio to be transferred to the playback device 102*c*, which may then cause the playback device 102*c* to play back the audio. For instance, the playback device 102*c* may continue (i.e., "pick up") playback of the audio from the point in the audio last played by the playback device 102*d*. In some implementations, a transfer of audio from one device to another may result in the device that was playing the audio pre-transfer to stop play back of the audio after the transfer.

As one illustrative example of such an association, the playback device 102*c* may take the form of a networked set of headphones like the playback device 102*o*. A user might bring the headphones within proximity to the playback device 102*d* that is playing back audio and provide an input at an input interface (e.g., a physical button) of the headphones indicating a request for the audio to be transferred to the headphones (e.g., so that the user can leave his home and continue listening to the audio). In response to the input, the headphones may then transmit a message indicating the transfer request to the playback device 102*d*, thereby causing the playback device 102*d* to identify a trigger event. Other examples of associations between two or more playback devices are also possible.

As illustrated in FIG. 5, the playback device 102*d* identifying the trigger event is represented by the sound-code processor 576 receiving a signal, $S_T$, from a trigger source (e.g., a button of the playback device 102*d*, the wake-word engine 570, the network interface 224, etc.).

At block 804 of FIG. 8, based on the playback device 102*d* identifying the trigger event, the playback device 102*d* creates a first sound code based on a first sound specimen detected by a microphone 222 of the playback device 102*d*. For instance, the playback device 102*d* may cause the sound-code processor 576 to generate the first sound code based on the sound-data stream $S_{DS}$ from at least one buffer 568. In this respect, the playback device 102*d* is configured to generate sound codes locally without interfacing a remote sound-code service (e.g., a hashing service) located outside of the LAN (e.g., a cloud-based sound-code service).

More specifically, the sound-code processor 576 is generally configured to process data related to a given sound specimen and generate a sound code (e.g., a hash code or "fingerprint") based on the given sound specimen. In practice, the data related to the given sound specimen may take a variety of forms, such as the detected-sound data itself that makes up the given sound specimen (e.g., the sound-data stream $S_{DS}$), data (e.g., metadata) indicative of one or more features of the given sound specimen, and/or some combination thereof, among other possibilities.

In example implementations, data indicative of one or more features of a given sound specimen may take a variety of forms, such as a time- or frequency-dependent representation of one or more features of the given sound specimen. Examples of such features may include frequency or frequency bands, zero-crossing position or rate, tempo, bandwidth, prominent tones, amplitude, decibel level, etc. Some examples of data indicative of one or more features of a given sound specimen are depicted and discussed below.

In operation, the sound-code processor 576 may be configured to generate a sound code by applying one or more sound-code algorithms to the data related to the given sound specimen. A sound-code algorithm may generally take as input the data related to the given sound specimen, map the input data to one or more code values of fixed sizes, and output a sound code indicative of those values.

In practice, a sound-code algorithm can take a variety of forms. As one example, the sound-code algorithm may take the form of a sound-hash algorithm (also referred to as a "hash function") that may map spectral features of a spectrogram or some other representation of the given sound specimen and output a sound hash indicative of that mapping. Additionally, or alternatively, the sound-code algorithm may take the form of a locality-sensitive sound-code algorithm that maps similar inputs (i.e., a range of input data values) to the same output sound code. In example implementations, the sound-code processor 576 may generate a sound code by utilizing one or more third-party sound-code (e.g., hashing) algorithms, such as algorithms provided by Shazam, FDMF, MusicURI, jHears, Gracenote MusicID, Philips, etc., and/or by utilizing one or more first-party hashing algorithms.

In any case, a sound code generated by the sound-code processor 576 provides a representation of one or more features of a sound specimen, such as frequency bands, bandwidth, prominent tones, decibel levels, etc. In this respect, a sound code may take a variety of forms. For instance, a sound code may be an alphabetic, a numeric, or an alpha-numeric sequence of characters that represent the one or more features of the sound specimen. As one particular example, a sound code may include, for example, eight, sixteen, or some other number of hexadecimal characters, among other examples. In some instances, a sound code may be or otherwise include a sound hash. Other example forms of a sound code are also possible.

Figure 6B:
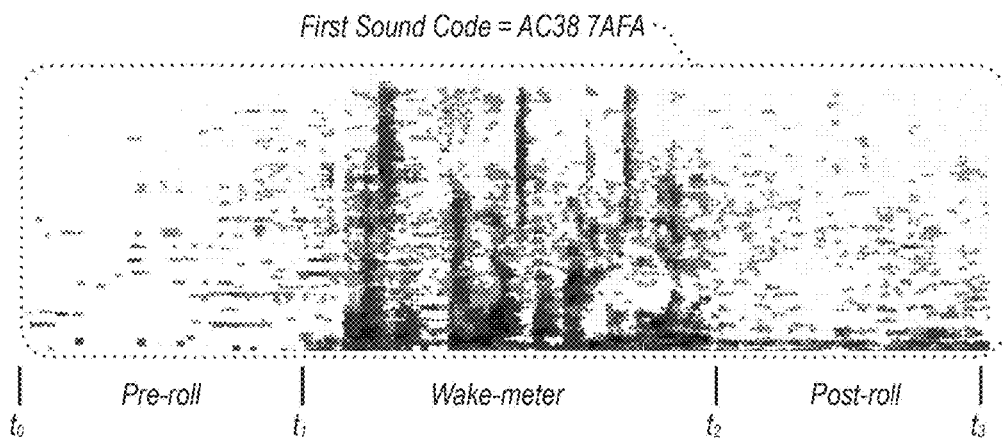
FIG. 6B is a graph depicting an example sound specimen in accordance with aspects of the disclosure.

As an illustrative example, FIG. 6B shows an example first sound specimen and an example first sound code (e.g., "AC38 7AFA") generated by the sound-code processor 576 of the playback device 102*d* based on the example first sound specimen. In this example, the sound specimen corresponds to the sound-data stream $S_{DS}$ (e.g., one or more audio frames) associated with the spotted wake word 680a of FIG. 6A. As illustrated, the example first sound specimen comprises sound detected in the playback device 102d's environment (i) immediately before a wake word was spoken, which may be referred to as a pre-roll portion (between times $t_0$ and $t_1$), (ii) while the wake word was spoken, which may be referred to as a wake-meter portion (between times $t_1$ and $t_2$), and/or (iii) after the wake word was spoken, which may be referred to as a post-roll portion (between times $t_2$ and $t_3$). Other sound specimens are also possible. In any case, in this illustrated example, the first sound code ("AC38 7AFA") was generated using the detected-sound data that makes up the first sound specimen (e.g., the sound-data stream $S_{DS}$) that was detected by a microphone 222 of the playback device 102d.

Figure 6C:
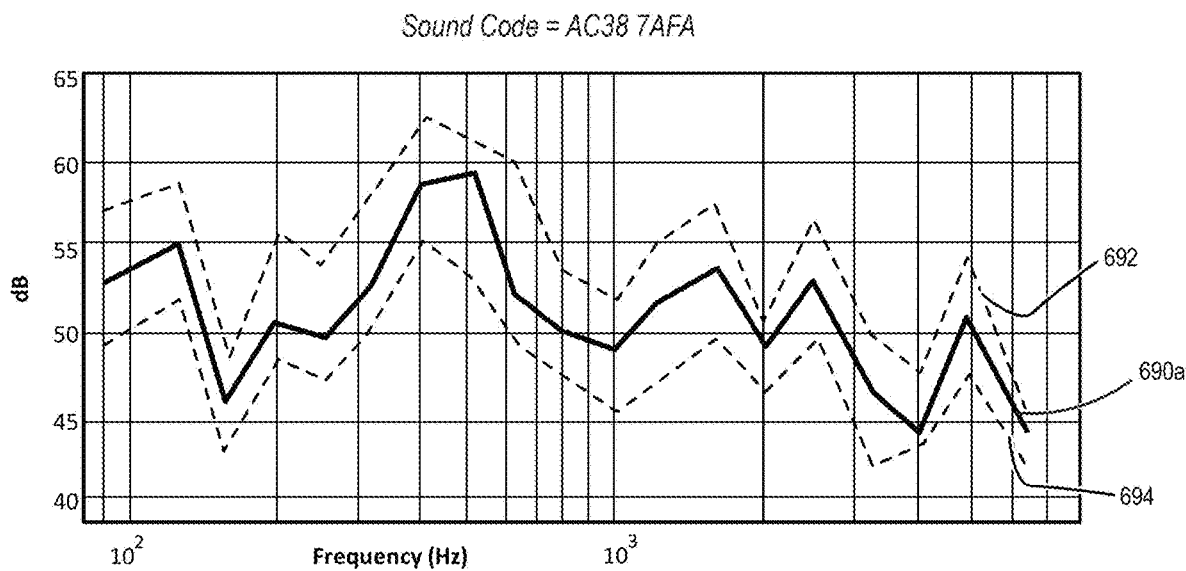
FIGS. 6C-6F are graphs depicting example data related to given sound specimens and example sound codes generated from such data in accordance with aspects of the disclosure.

To illustrate another example, FIG. 6C shows data related to the first sound specimen that forms the basis for the sound-code processor 576 outputting the first sound code ("AC38 7AFA"). In this example, the data related to the first sound specimen takes the form of metadata that provides a median frequency response 690a taken from multiple frequency responses captured over six channels (i.e., six microphones) during a given sound-specimen window (e.g., the time window defined over the time period spanning $t_0$ to $t_3$ from FIG. 6B or over a different time period, such as the pre-roll portion). In this illustrated example, the sound-code processor 576 generated the first sound code ("AC38 7AFA") utilizing a locality-sensitive sound-code algorithm that outputs the same sound code ("AC38 7AFA") for any input frequency response whose curve falls within upper boundary 692 and lower boundary 694. Other examples are also possible.

In embodiments where data related to a given sound specimen (e.g., metadata like a frequency response) forms the basis for a sound code, the sound-code processor 576 may be configured to generate, extract, or otherwise obtain such data from the given sound specimen or may rely on another component of the playback device 102d to perform such a function. In some such instances, the sound-code processor 576 may include a dedicated buffer or may leverage a buffer 568 that stores such data. In one aspect, the sound-code processor 576 generating sound codes based on data related to a sound specimen, such as metadata, may alleviate privacy concerns (e.g., eavesdropping and retaining conversations) because the data does not reveal the content of any speech but instead is indicative of certain unique features of the detected sound itself. In a related aspect, the data related to a sound specimen may be communicated between computing devices, such as the various computing devices of the MPS 100 without implicating privacy concerns. In practice, the MPS 100 can use the data to adapt and fine-tune voice processing algorithms, including algorithms for generating sound codes, filtering speech, identifying wake words, etc.

In still further embodiments, a sound code may include or be based on direction of arrival information, which general provides an indication of the position of a sound source relative to a device that detected sound from that source. In some such implementations, the sound-code processor 576 may apply one or more direction of arrival algorithms to a sound specimen. In other implementations, such algorithms may be part of sound-code algorithms and/or other algorithms.

In some instances, prior to block 804 of FIG. 8, the playback device 102d may not be playing back audio. In some such instances, after block 802 but before block 804, the playback device 102d may cause itself (or alternatively, another playback device that may or may not have a previously-established association with the playback device 102d) to play a tone or the like (or perhaps start playing back music) via its speakers 218. Then, the playback device 102d's microphones 222 may detect that audio and the sound-code processor 576 may then create the first sound code that is representative of the played back audio (e.g., an audio hash).

In other instances in which the playback device 102d is not playing back audio prior to block 804, the playback device 102d may determine that some other playback device in the MPS 100 is playing back audio (e.g., the playback device 102c or another playback device). In practice, the playback device 102d may make such a determination in a variety of manners, such as based on analysis of sound detected by its microphones 222 and/or based on a state variable or the like of the other playback device indicating its playback state. In any case, after making the determination, the playback device 102d may generate the first sound code despite the playback device 102d itself not playing back audio. In this respect, playback devices may create more accurate sound codes when only a single, nearby playback device is rendering audio compared to when multiple, nearby playback devices are rendering audio.

In yet other instances, even if no playback device is currently rendering audio, the playback device 102d may nevertheless create the first sound code, which may be representative of other ambient noises in the playback device 102d's environment.

At block 806 of FIG. 8, the playback device 102d receives from at least the playback device 102c a sound object. In practice, this sound object may take a variety of forms. As one possibility, the sound object may take the form of a sound specimen comprising sound detected by one or more microphones of the playback device 102c. As another possibility, the sound object may take the form of a sound code (e.g., a sound hash) created by the playback device 102c's own sound-code processor based on a sound specimen comprising sound detected by its one or more microphones. As yet another possibility, the sound object may take the form of data (e.g., metadata) indicative of one or more features (e.g., gain and/or spectral features) of a sound specimen comprising sound detected by one or more microphones of the playback device 102c.

In any case, as illustrated in FIG. 5, the playback device 102d receiving the sound object is represented by the sound-code processor 576 receiving a sound object, $S_O$, from the network interface 224 that received a message or the like comprising the sound object $S_O$ from another microphone-equipped device in the MPS 100.

In some implementations, the playback device 102d may receive the sound object in response to the playback device 102d sending to at least the playback device 102c a request for a sound object. In practice, such a request may take a variety of forms. As one possibility, the request may specify that the recipient playback device (e.g., the playback device 102c) is to provide a certain type of sound object, such as a sound specimen detected by (or perhaps on behalf of) the recipient playback device, a sound code created by (or perhaps on behalf of) the recipient playback device based on sound detected in the recipient playback device's environment, or data indicative of one or more particular features of a sound specimen from the recipient playback device's environment. As another possibility, the request may generically instruct the recipient playback device to provide a sound object in which case the recipient playback device determines what form of a sound object it will provide. Other examples of a request for a sound object are also possible.

In other implementations, the playback device 102c may receive a different trigger (e.g., an input at the playback device 102c) that causes the playback device 102c to send the sound object to the playback device 102d. For example, returning to the networked set of headphones example, the headphones may send the sound object to the playback device 102d based on receiving the input (e.g., physical button press) indicating the request for the audio being output by the playback device 102d to be transferred to the headphones. In this respect, the headphones may send the sound object as part of, or separate from, the message that the headphones send to the playback device 102d indicating the transfer request.

At block 808 of FIG. 8, based on receiving the sound object, the playback device 102d identifies a second sound code, which it may do in different manners depending on the form of the sound object. For example, if the sound object is a sound specimen detected by (or perhaps on behalf of) the playback device 102c, then the playback device 102d may identify the second sound code by creating the second sound code based on that sound specimen. In particular, referring back to FIG. 5, the network interface 224 of the playback device 102d may receive the sound object $S_O$ that takes the form of a sound specimen for the playback device 102c and provide the sound object $S_O$ to the sound-code processor 576 that then generates the second sound code in line with the above-discussion with reference to block 804. As another example, if the sound object is or otherwise includes data indicative of one or more particular features of a sound specimen for the playback device 102c, the playback device 102d may likewise utilize the sound-code processor 576 to generate the second sound code.

As yet another example, if the sound object is or otherwise includes the second sound code, then the playback device 102d may identify the second sound code by receiving and processing the sound object. In this regard, the sound-code processor 576 may be configured to receive a sound object and identify the form of the sound object. When the sound-code processor 576 determines that a sound object is not already in the form of a sound code, the sound-code processor 576 may generate a sound code based on the sound object in the same way it generates a sound code based on the sound-data stream $S_{DS}$ from the one or more buffers 568. The playback device 102d may identify the second sound code in other manners as well.

Figure 6D:
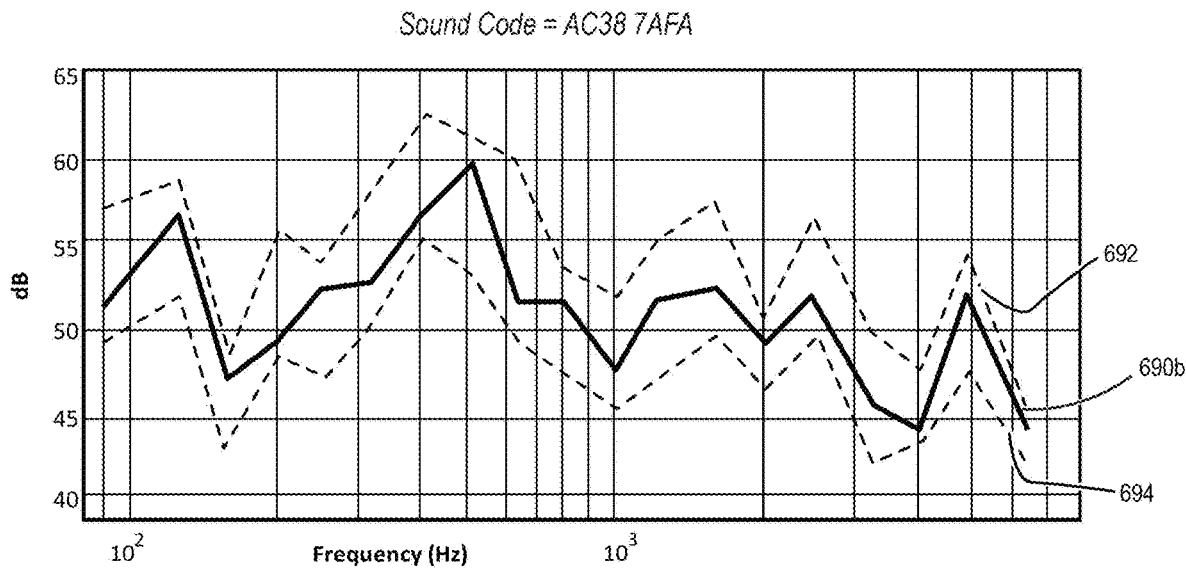

As an illustrative example, FIG. 6D shows data related to a second sound specimen that forms the basis for the sound-code processor 576 identifying the second sound code (e.g., "AC38 7AFA"). In this example, the data related to the second sound specimen takes the form of metadata that provides a median frequency response 690b taken from multiple frequency responses captured over six channels (i.e., six microphones of the playback deice 102c) during a given sound-specimen window (e.g., a time window corresponding to the same time period represented in FIG. 6C). In this illustrated example, the sound-code processor 576 generated the second sound code ("AC38 7AFA") utilizing the same locality-sensitive sound-code algorithm that it utilized to generate the first sound code (FIG. 6C). Because the frequency response 690b falls within the upper and lower boundaries 692 and 694, respectively, for the locality-sensitive sound-code algorithm, the second sound code is the same as the first sound code.

In some example implementations, the particular sound-code algorithm utilized and/or the particular upper and lower boundaries for the particular sound-code algorithm utilized may vary depending on the particular association that was requested at block 802. In other words, the amount of variation between values of data related to a sound specimen that result in the same sound code being generated may vary depending on the requested association. For example, the relative spacing between the upper and lower boundaries 692 and 694 may be decreased for a requested association of a bonded pair, whereas the relative spacing may be increased for a requested association of joining the MPS 100. Other examples are also possible.

In operation, the playback device 102d may receive sound objects and subsequently identify sound codes related thereto for multiple playback devices and/or NMDs. For instance, in addition to receiving the sound object from the playback device 102c, the playback device 102d may also receive a sound object (and subsequently identify a sound code based thereon) from the NMD-equipped playback device 102m. In some implementations, the playback device 102d may be configured to receive sound objects and subsequently identify sound codes related thereto for each NMD-equipped playback device and/or NMD that is registered as a member of the MPS 100. Additionally, or alternatively, the playback device 102d may be configured to receive sound objects and subsequently identify sound codes related thereto for each NMD-equipped playback device and/or NMD that is communicatively coupled to the playback device 102d (e.g., via a local communication network, such as a home WiFi network or a Bluetooth connection). Other possibilities also exist.

At block 810 of FIG. 8, based at least on the first sound code and the second sound code, the playback device 102d may determine that the playback device 102d and the playback device 102c have a spatial relationship. In example implementations, playback devices are deemed to have a spatial relationship when the sound codes indicate that the playback devices are located within a threshold proximity of one another (e.g., within one foot, within one meter, etc.) or that they are located in the same area (e.g., in a particular room or in adjacent rooms) or the same environment (e.g., in the same house). In other words, the playback device 102d may be configured to infer from the sound codes that the playback devices have a spatial relationship.

Notably, playback devices in the MPS 100, such as the playback device 102d, being configured with this functionality may be advantageous over existing systems because the spatial relationship determination can be performed locally at the MPS 100 without relying on a cloud-server or the like, which may not always be available to the MPS 100 due to network connectivity, etc. Furthermore, playback devices in the MPS 100, such as the playback device 102d, being configured with this functionality may be advantageous over existing systems because the spatial relationship determination is performed quicker since it is being done locally (i.e., where the sound forming the basis for the determination is detected) and does not require round-trip network communications with a cloud-server or the like. Other advantages may also exist.

In practice, the playback device 102d may determine whether a spatial relationship exists in a variety of manners, which may depend on the nature of the sound codes. As one possibility, the playback device 102d may determine whether a spatial relationship exists by determining whether the first and second sound codes are considered to "match" one another. In some implementations, sound codes are considered a match if they are identical to one another. For example, the first and second sound codes illustrated in FIGS. 6C and 6D are considered to match since they are identical. In other implementations, sound codes are considered to match if they are substantially similar to one another (e.g., a threshold amount or a particular portion of the sound codes match). For instance, in a case where the first and second sound codes take the form of eight-character, hexadecimal codes, if a predetermined number (e.g., 5 or more) of corresponding characters from the two codes are equivalent, then the playback device 102d may determine that there is a match. In any case, if the codes match, the playback device 102d determines that a spatial relationship does exist. Otherwise, the playback device 102d determines that such a relationship does not exist.

As another possibility, the playback device 102d may determine that a spatial relationship exists when one or more differences between the first and second sound codes are within one or more respective thresholds. For example, if an overall value of the first sound code differs from an overall value of the second sound code by a differential amount that is within a given threshold, then the playback device 102d may determine that a spatial relationship exists. As another example, assume the first and second sound codes each include a first and a second character, if the differences between the first characters and the second characters are each within respective threshold differentials, then the playback device 102d may determine that a spatial relationship exists. Other possibilities also exist.

As noted before, the playback device 102d may identify sound codes for additional playback devices as well. In such cases, the playback device 102d may apply one or more of the above-mentioned analyses to three or more sound codes to determine whether a spatial relationship exists between the playback device 102d and the playback device 102c. In some instances, the playback device 102d may analyze sound codes to determine whether a spatial relationship exists between the playback device 102c and some other playback device other than the playback device 102d.

In some cases, the playback device 102d may determine that no spatial relationship exists between the playback device 102d and the playback device 102c. As a result, the playback device 102d may determine that the playback device 102c cannot be associated with the playback device 102d at that time and may then terminate the association process.

For example, the playback device 102c may have been placed on the island located in the Kitchen 101h. The requested association between the playback device 102d (located on the bookcase in the Living Room 101f) and the playback device 102c may have been to bond the playback device 102c with the playback device 102i so that the devices provide a "stereo" image. For such an association, the devices may be required to have a spatial relationship in which the two playback devices are located within 15 feet of one another (which may be required for optimal sounding stereo sound). Based on sound codes for both the devices, which may have been generated based on a locality-sensitive sound-code algorithm with particular boundaries tuned for the requested bonded association, the playback device 102d may determine that such a spatial relationship does not exist (e.g., the distance between the Kitchen island and the Living Room bookcase is greater than 15 feet). Consequently, the playback device 102d may terminate the association process and may also provide some indication of the termination, such as by outputting a particular tone or the like to a user. In some cases, acoustic interference caused by physical barriers (walls, structures, objects, etc.) between areas in which separate playback devices are situated may cause playback devices to yield different sound codes even when they are located in close proximity (e.g., within 15 feet, but having a barrier, such as a wall, between them). For example, in the home environment 101 (FIG. 1A), the wall(s) between the Living Room 102f and the Kitchen 101h may prevent certain playback devices in the respective Kitchen and Living Room areas from yielding matching sound codes, which may have otherwise matched in the absence of the wall(s).

Figure 6E:
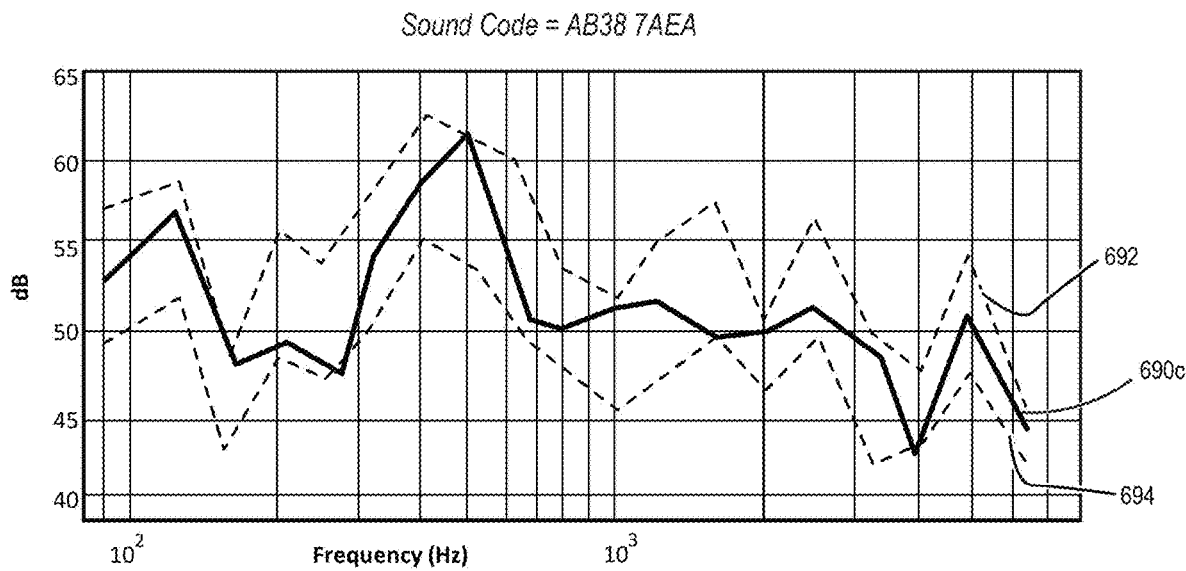

As an illustrative example, FIG. 6E shows data related to a sound specimen that forms the basis for the sound-code processor 576 identifying a sound code (e.g., "AB38 7AEA") that does not match the first sound code ("AC38 7AFA"). This illustrated example may correspond to an alternative second sound specimen and related second sound code for the playback device 102c. In this example, the data related to the sound specimen takes the form of metadata that provides a median frequency response 690c taken from multiple frequency responses captured over six channels during a given sound-specimen window (e.g., a time window corresponding to the same time period represented in FIG. 6C). As before, the sound-code processor 576 generated the sound code ("AB38 7AEA") utilizing the same locality-sensitive sound-code algorithm that it utilized to generate the first sound code (FIG. 6C). Because portions of the frequency response 690c fall outside of the upper and lower boundaries 692 and 694, respectively, for the locality-sensitive sound-code algorithm, the sound code ("AB38 7AEA") differs from the first sound code ("AC38 7AFA"). As a result, the playback device 102d would determine that no spatial relationship exists between the playback devices.

At block 812 of FIG. 8, based on the playback device 102d determining that the playback device 102d and the playback device 102c have a spatial relationship, the playback device 102d may cause the playback device 102d and the playback device 102c to be associated in accordance with the request indicated by the trigger event identified at block 802. For example, the sound-code processor 576 may determine that the first and second sound codes match (i.e., a spatial relationship exists) and then provide an association signal, $S_A$, to the network interface 224 that then transmits the signal to the playback device 102c.

In line with the above discussion, the requested association may take a variety of forms, and so, the playback device 102d may cause the playback devices to be associated in a variety of manners. As one possibility, the requested association may be for the playback device 102c to join the MPS 100 (i.e., be setup or otherwise registered with the MPS 100) that the playback device 102d has already been setup or otherwise registered with. The playback device 102d may cause the playback devices to be associated in accordance with such a requested association by facilitating the playback device 102c joining the MPS 100, which may involve the playback device 102d exchanging MPS 100 configuration information with the playback device 102c or causing a controller device 104 to exchange MPS 100 configuration information with the playback device 102c.

As another possibility, the requested association may be for the playback device 102d and the playback device 102c to be arranged in accordance with any of the above-mentioned device configurations (e.g., a playback group, bonded pair, merged zone, an Area, etc.). The playback device 102d may cause the playback devices to be associated in accordance with such a requested association by facilitating the formation of the particular device configuration, which may involve the playback device 102d exchanging device-configuration information with the playback device 102c and/or a controller device 104 or causing a controller device 104 to exchange device-configuration information with the playback device 102c.

For example, if the requested device configuration is a playback group, the playback device 102d may facilitate the playback device 102c joining the playback group of the playback device 102d, which may involve the playback device 102d causing the playback device 102c to obtain audio, corresponding playback timing information, and clock time information from the playback device 102d for synchronous audio playback. As another example, if the requested device configuration is a bonded set, the playback device 102d may facilitate the playback device 102d and the playback device 102c forming a bonded set, which may involve the playback device 102d causing the playback device 102c to be assigned a particular playback responsibility.

As yet another possibility, the requested association may be for audio being played back by the playback device 102d to be transferred to the playback device 102c. The playback device 102d may cause the playback devices to be associated in accordance with such a requested association by facilitating the playback device 102c playing back the audio, which may involve the playback device 102d exchanging playback status information (e.g., an identifier corresponding to the audio and an indication of the playback device 102d's playback position within the audio) with the playback device 102c or causing a controller device 104 to exchange playback status information with the playback device 102c. For example, returning to the networked set of headphones example, the playback device 102d may cause the playback devices to be associated by sending a URI or URL corresponding to the audio being played by the playback device 102d and a location identifier within the audio corresponding to the playback device 102d's playback position. The headphones may then use the URI or URL to obtain the audio, and then utilize the location identifier to pick up play back of the audio where the playback device 102d left off. In some cases, the playback device 102d may also cause itself to stop playback of the audio.

In example implementations, after the playback device 102d causes the playback device 102d and the playback device 102c to be associated in accordance with the request indicated by the trigger event identified at block 802, at least one of these devices (e.g., the playback device 102d) may provide an indication of the successful association. For example, the playback device 102d may output a particular tone or the like to the user that is indicative of a successful association. Other examples are also possible.

In some implementations, the playback device 102d may be configured to cause the playback devices to be associated in accordance with a requested association even if the playback device 102c is not setup or otherwise registered as a member of the MPS 100. In this way, the playback device 102d may allow the playback device 102c to temporarily join the MPS 100, which may continue for a predetermined amount of time or as long as the association is maintained, among other possibilities. In example implementations, the playback device 102d may allow the playback device 102c to temporarily join the MPS 100, and then be associated with the playback device 102d, based on the playback device 102c providing to the playback device 102d a network credential or the like for a network (e.g., home WiFi network) that the playback device 102d is connected. Other possibilities also exist.

In some example implementations, before the playback device 102d determines whether the playback device 102d and the playback device 102c have a spatial relationship, the playback device 102d may be configured to determine whether the first and second sound codes are representative of sound specimens obtained at the same point in time or around the same point in time. If the playback device 102d determines that there is a temporal misalignment (e.g., the sound specimen that forms the basis for the second sound code was obtained, for instance, 50 milliseconds after the sound specimen for the first sound code was obtained), which may occur because of network and/or processing latency that exist between the playback device 102d and the playback device 102c, the playback device 102d may adjust a timeframe related to the sound object that it received from the playback device 102c (i.e., at block 806) such that it is temporally aligned with a timeframe related to the playback device 102d's sound object. This functionality may promote a more accurate determination of whether a spatial relationship exists between the playback devices.

In practice, the playback device 102d may determine whether the first and second sound codes are representative of sound specimens obtained at the same point in time or around the same point in time in a variety of manners. As one possibility, each playback device in the MPS 100 may be configured to apply a time indicator (e.g., a timestamp) to its sound objects that identifies when the sound object was obtained (e.g., in the case of a sound-specimen sound object) or generated (e.g., in the case of a sound-specimen sound code). Before analyzing the sound codes to determine whether a spatial relationship exists, the playback device 102d may utilize time indicators related to the sound codes to ensure that the sound codes correspond to sound specimens that were detected at or around the same point in time and to facilitate adjusting one or more timeframes if necessary.

Figure 6F:
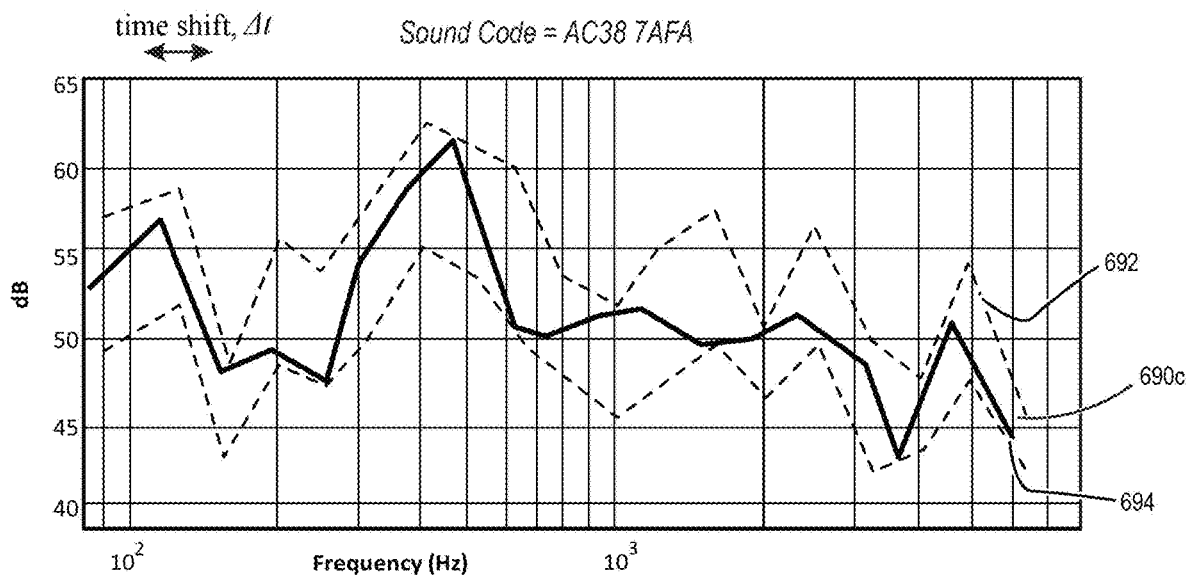

To illustrate, FIG. 6F shows data related to a sound specimen that forms the basis for the playback device 102d's sound-code processor 576 (FIG. 5) identifying a sound code after adjusting a timeframe of the data related to the sound specimen by a time differential, $\Delta t$. More specifically, the playback device 102d adjusted a timeframe of the data related to the sound specimen that formed the basis for the former sound code (e.g., "AB38 IAEA") shown in FIG. 6E—that did not match the first sound code ("AC38 7AFA" illustrated in FIG. 6A)—by the time differential $\Delta t$, which aligned that data with a timeframe of the sound-specimen data that formed the basis of the playback device 102d's sound code (i.e., the first sound code). With these timeframes now more precisely aligned, as illustrated in FIG. 6F, the playback device 102d identifies a second sound code ("AC38 7AFA") that matches its own sound code.

In some cases, the playback device 102d may be unable to adjust a timeframe related to the sound object that it received from the playback device 102c (e.g., because the time differential $\Delta t$ exceeds a threshold value). In some such cases, the playback device 102d may be configured to repeat some or all of the functions related to blocks 804-808 until the playback device 102d is able to utilize temporally aligned sound codes. Other possibilities also exist.

In some implementations, the time indicators may be based on a system clock that is common to all of the playback devices in the media playback system 100 (e.g., a clock time provided by a WiFi router, etc.), and so, determining whether a timeframe adjustment is needed may involve comparing time indicators related to sound codes. However, in other implementations, a given time indicator may be based on the device clock of the particular playback device that obtains a sound specimen or generates a sound code. As such, a first time indicator related to the first sound code may be based on, for example, a clock of the playback device 102d, while a second time indicator related to the second sound code may be based on, for example, a clock of the playback device 102c. In operation, these different device clocks generally are not aligned, and so, if these playback devices generate respective time indicators at the same point in time, the respective values (i.e., clock readings) for these time indicators may differ.

To help with this technical problem, the playback devices of the MPS 100 may be configured to exchange clock-time information (e.g., via NTP packet exchanges) to facilitate determining a clock-time differential between their respective clocks. In practice, the playback device 102d may utilize the clock-time differential between its device clock and the device clock of the playback device 102c, along with the time indicator related to the playback device 102c's sound object, to facilitate determining whether there is a temporal misalignment, and if so, temporally align the playback device 102c's sound object with the playback device 102d's sound object. Example methods for processing clock timing information, which may facilitate aligning sound-object timeframes, can be found in previously referenced U.S. Pat. No. 8,234,395.

As another possible manner by which the playback device 102d may determine whether the first and second sound codes are representative of sound specimens obtained at the same point in time or around the same point time, the playback device 102d may be configured to perform correlation analysis between a sound specimen from the playback device 102c and the playback device 102d's own sound specimen (i.e., from block 804). In some implementations, if the playback device 102d determines that the sound specimens are not correlated, the playback device 102d may perform one or more processes to facilitate aligning the sound specimens. Other example functions are also possible.

IV. Example Playback Device Association Signal Flow

As discussed above, the playback device 102d performing the method 800 may involve the playback device 102d communicating with one or more playback devices and/or NMDs in addition to the playback device 102c. As also mentioned before, the playback device 102d, or some other playback device that may not include a microphone, may perform the method 800, or at least certain functions thereof, to determine whether a spatial relationship exists between two other playback devices (e.g., two portable playback devices) to facilitate associating those two other playback devices. In some such instances, only one of the two other playback devices may be NMD-equipped, while in other such instances, each of the two other playback devices is NMD-equipped.

Figure 9:
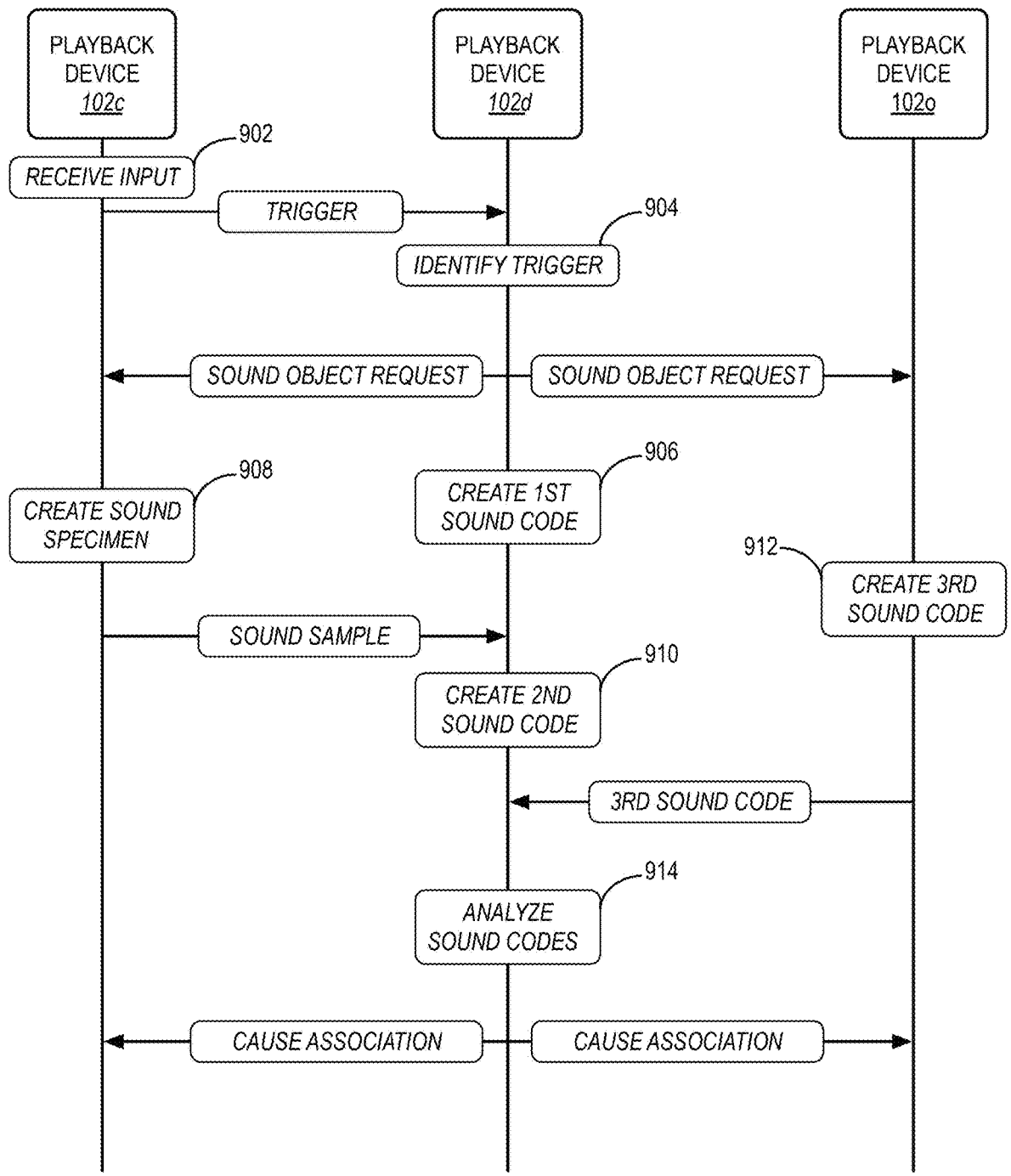
FIG. 9 is a signal flow diagram for associating playback devices based on sound codes in accordance with aspects of the disclosure.

In any case, the playback device 102d may perform the same or similar functions for each playback device and/or NMD when several such devices are involved with associating two or more playback devices based on sound codes. To help illustrate one possible example of this arrangement, FIG. 9 provides a signal flow diagram for associating playback devices based on sound codes. The functions associated with the illustrated functional blocks may generally be performed in line with the discussion of FIG. 8.

As shown in FIG. 9, the playback device 102d is configured to determine whether a spatial relationship exists between the playback device 102c and the playback device 102o, each of which may be a portable, NMD-equipped playback device. The playback devices 102c and 102o both may have been placed on the Patio 101i of the home environment 101 of FIG. 1A.

At block 902, the playback device 102c receives an input indicating a request to associate the playback device 102c with at least the playback device 102o. For example, a button press or combination of button presses at the playback device 102c may indicate a request to form a playback group with any playback devices within 10 feet of the playback device 102c. In any case, the playback device 102c may send a trigger message to the playback device 102d via a local communication network (e.g., the LAN 111).

At block 904, the playback device 102d identifies the trigger event indicating the request to associate the playback device 102c with other playback devices proximate to the playback device 102c. Based on this identification, the playback device 102d transmits via the local communication network a sound object request to at least the playback devices 102c and 102o. In practice, the playback device 102d may send this request to any or all additional microphone-equipped playback devices and/or NMDs of the MPS 100.

At block 906, the playback device 102d generates a first sound code for itself based on a sound specimen from its environment. In operation, the playback device 102d may perform this function before, after, or simultaneous with sending the sound object request.

At block 908, in response to receiving the sound object request, the playback device 102c creates a sound specimen utilizing one or more of its onboard microphones. In an implementation in which the playback device 102c is not NMD-equipped or otherwise does not include an onboard microphone, the playback device 102c may leverage an NMD or other microphone device associated with the playback device 102c to obtain a sound specimen for the playback device 102c. In any case, the sound specimen is sent as the playback device 102c's sound object to the playback device 102d. At block 910, based on the sound object for the playback device 102c, the playback device 102d generates a second sound code.

Before, after, or simultaneous with one or more of the functions of blocks 906-910, the playback device 102o generates a third sound code in response to receiving the sound object request. The playback device 102o then transmits via the local communication network the third sound code to the playback device 102d.

At block 914, the playback device 102d analyzes at least the first, second, and third sound codes to determine whether the playback devices 102c and 102o have a spatial relationship. For instance, the playback device 102d may determine whether it can infer from the first, second, and third sound codes that the playback devices 102c and 102o are within 10 feet of one another.

If it makes such a determination, the playback device 102d may then cause the playback devices 102c and 102o to be associated in accordance with the request from the trigger event. For example, the playback device 102d may cause the playback devices 102c and 102o to be part of the same playback group to playback music in synchrony when the playback device 102d determines that at least the second and third sound codes are deemed to match.

In practice, although FIG. 9 depicts the playback device 102d sending a signal to each of the playback devices 102c and 102o to cause them to be associated with one another, this might not always be the case. Instead, the playback device 102d may only send a signal to one of the playback devices 102c and 102o (e.g., the device that is designated the group coordinator), or the playback device 102d may not send a signal to either of the playback devices 102*c* and 102*o* but instead may send a control device 104 that in turn communicates with one or more of the playback devices 102*c* and 102*o*. Other possibilities also exist.

Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

The present technology is illustrated, for example, according to various aspects described below. Various examples of aspects of the present technology are described as numbered examples (1, 2, 3, etc.) for convenience. These are provided as examples and do not limit the present technology. It is noted that any of the dependent examples may be combined in any combination, and placed into a respective independent example. The other examples can be presented in a similar manner.

Example 1: A method comprising: identifying a trigger event indicating a request to associate a first playback device with at least a second playback device; based on identifying the trigger event, creating a first sound code based on a first sound specimen detected via at least one microphone of the first playback device; after identifying the trigger event, receiving from the second playback device, via a network interface of the first playback device, a sound object; based on receiving the sound object, identifying a second sound code; based at least on the first sound code and the second sound code, determining that the first and second playback devices have a spatial relationship; and based on the determination, causing the first and second playback devices to be associated in accordance with the indicated request. Example 2: The method of Example 1, wherein identifying the trigger event comprises one of (i) detecting, via the at least one microphone, a voice input indicating the request to associate the first playback device with at least the second playback device, (ii) receiving from the second playback device, via the network interface, a message indicating the request to associate the first playback device with at least the second playback device, or (iii) detecting, via an input interface of the first playback device, an input indicating the request to associate the first playback device with at least the second playback device. Example 3: The method of any one of Examples 1-2, wherein the sound object comprises one of (i) a second sound specimen captured by the second playback device or (ii) the second sound code, wherein the second sound code is created by the second playback device. Example 4: The method of any one of Examples 1-3, wherein identifying the second sound code comprises creating the second sound code based on the sound object. Example 5: The method of any one of Examples 1-4, wherein the method further comprises, based on identifying the trigger event, playing back audio, wherein the first sound code is representative of the played back audio, and wherein the sound object either (i) comprises a second sound specimen that is representative of the played back audio or (ii) comprises a second sound code representative of the played back audio. Example 6: The method of any one of Examples 1-5, wherein the first sound code comprises a first locality-sensitive hash, and wherein the second sound code comprises a second locality-sensitive hash. Example 7: The method of any one of Examples 1-6, wherein identifying the trigger event comprises identifying a trigger event indicating a request to form a playback group, and wherein causing the first and second playback devices to be associated in accordance with the indicated request comprises facilitating causing the second playback device to join a playback group of the first playback device. Example 8: The method of any one of Examples 1-6, wherein the first playback device is part of a media playback system, wherein identifying the trigger event comprises identifying a trigger event indicating a request for the second playback device to join the media playback system, and wherein causing the first and second playback devices to be associated in accordance with the indicated request comprises causing the second playback device to join the media playback system. Example 9: The method of any one of Examples 1-6, wherein identifying the trigger event comprises identifying a trigger event indicating a request to transfer audio being played back at the first playback device to the second playback device, and wherein causing the first and second playback devices to be associated in accordance with the indicated request comprises causing the second playback device to play back the audio. Example 10: The method of any one of Examples 1-9, wherein the first sound specimen comprises a first time indicator, wherein the sound object comprises a second time indicator, and wherein the method further comprises, before determining that the first and second playback devices have the spatial relationship, adjusting a timeframe related to the second sound code based at least on the first time indicator and the second time indicator.

Example 11: A first playback device comprising: a network interface; one or more processors; at least one microphone; and a tangible, non-transitory, computer-readable medium having instructions stored thereon that are executable by the one or more processors to cause the first playback device to perform the functions of any one of Examples 1-10.

Example 12: A tangible, non-transitory, computer-readable medium having instructions stored thereon that are executable by one or more processors to cause a first playback device to perform the functions of any one of Examples 1-10.

The invention claimed is:

1. A first playback device comprising:
at least one microphone;
at least one processor;
at least one non-transitory computer-readable medium; and
program instructions stored on the at least one non-transitory computer-readable medium that are executable by the at least one processor such that the first playback device is configured to:
   detect a command to establish an association between the first playback device and at least one playback device of a local media playback system;
   based on the command, detect a sound specimen via the at least one microphone;
   transmit, to a second playback device and a third playback device of the local media playback system, a first sound object based on the sound specimen;
   based on a comparison between the first sound object and (i) a second sound object produced by the second playback device and (ii) a third sound object produced by the third playback device, determine that the first playback device has a spatial relationship with the second playback device and does not have a spatial relationship with the third playback device;
   based on determining that the first playback device has a spatial relationship with the second playback device and does not have a spatial relationship with the third playback device, determine that the first playback device is to establish the association with the second playback device, and not the third playback device; and
   cause the association between the first playback device and the second playback device to be established.

2. The first playback device of claim 1, wherein the association comprises at least one of (i) a playback system membership association or (ii) a playback synchrony association indicating a given playback group configuration involving the first playback device.

3. The first playback device of claim 2, further comprising program instructions stored on the at least one non-transitory computer-readable medium that are executable by the at least one processor such that the first playback device is configured to:
   after causing the association between the first playback device and the second playback device to be established, play back audio content in synchrony with at least the second playback device.

4. The first playback device of claim 1, wherein the program instructions that are executable by the at least one processor such that the first playback device is configured to detect the command to establish the association comprise program instructions that are executable by the at least one processor such that the first playback device is configured to:
   identify a trigger event indicating the command to establish the association between the first playback device and at least one playback device of the local media playback system.

5. The first playback device of claim 4, wherein the program instructions that are executable by the at least one processor such that the first playback device is configured to identify the trigger event comprise program instructions that are executable by the at least one processor such that the first playback device is configured to:
   determine that the first playback device is within range of the local media playback system.

6. The first playback device of claim 4, wherein the program instructions that are executable by the at least one processor such that the first playback device is configured to identify the trigger event comprise program instructions that are executable by the at least one processor such that the first playback device is configured to:
   receive, via a user interface of the first playback device, user input indicating the command to establish the association between the first playback device and at least one playback device of the local media playback system.

7. The first playback device of claim 4, wherein the program instructions that are executable by the at least one processor such that the first playback device is configured to identify the trigger event comprise program instructions that are executable by the at least one processor such that the first playback device is configured to:
   receive, from a control device associated with the local media playback system, an indication of the command to establish the association between the first playback device and at least one playback device of the local media playback system.

8. The first playback device of claim 1, wherein the first playback device is a portable playback device and the second and third playback devices are stationary playback devices, the first playback device further comprising program instructions stored on the non-transitory computer-readable medium that are executable by the at least one processor such that the first playback device is configured to:
   after a given period of time has lapsed, cause the association between the first playback device and the second playback device to be terminated.

9. The first playback device of claim 1, further comprising program instructions stored on the at least one non-transitory computer-readable medium that are executable by the at least one processor such that the first playback device is configured to:
   after transmitting, to the second playback device and the third playback device, the first sound object based on the sound specimen:
      receive the second sound object from the second playback device;
      receive the third sound object from the third playback device; and
      compare the first sound object to each of the second and third sound objects.

10. The first playback device of claim 9, wherein the program instructions that are executable by the at least one processor such that the first playback device is configured to determine that the first playback device has a spatial relationship with the second playback device and does not have a spatial relationship with the third playback device comprise program instructions that are executable by the at least one processor such that the first playback device is configured to:
   determine that either (i) the second sound object matches the first sound object or (ii) one or more differences between the second sound object and the first sound object are within one or more respective thresholds; and
   determine that either (i) the third sound object does not match the first sound object or (ii) one or more differences between the third sound object and the first sound object exceed one or more respective thresholds.

11. The first playback device of claim 1, wherein the first sound object comprises the sound specimen.

12. The first playback device of claim 1, further comprising program instructions stored on the non-transitory computer-readable medium that are executable by the at least one processor such that the first playback device is configured to:
create a first sound code based on the sound specimen, wherein the first sound object comprises the first sound code.

13. The first playback device of claim 1, further comprising program instructions stored on the non-transitory computer-readable medium that are executable by the at least one processor such that the first playback device is configured to:
after causing the association to be established, output one or both of an audio indication or a visual indication indicating that the association has been established.

14. A non-transitory computer-readable medium, wherein the non-transitory computer-readable medium is provisioned with program instructions that, when executed by at least one processor, cause a first playback device to:
detect a command to establish an association between the first playback device and at least one playback device of a local media playback system;
based on the command, detect a sound specimen via at least one microphone;
transmit, to a second playback device and a third playback device of the local media playback system, a first sound object based on the sound specimen;
based on a comparison between the first sound object and (i) a second sound object produced by the second playback device and (ii) a third sound object produced by the third playback device, determine that the first playback device has a spatial relationship with the second playback device and does not have a spatial relationship with the third playback device;
based on determining that the first playback device has a spatial relationship with the second playback device and does not have a spatial relationship with the third playback device, determine that the first playback device is to establish the association with the second playback device, and not the third playback device; and
cause the association between the first playback device and the second playback device to be established.

15. The non-transitory computer-readable medium of claim 14, wherein the association comprises at least one of (i) a playback system membership association or (ii) a playback synchrony association indicating a given playback group configuration involving the first playback device.

16. The non-transitory computer-readable medium of claim 15, wherein the non-transitory computer-readable medium is also provisioned with program instructions that, when executed by at least one processor, cause the first playback device to:
after causing the association between the first playback device and the second playback device to be established, play back audio content in synchrony with at least the second playback device.

17. The non-transitory computer-readable medium of claim 14, wherein the program instructions that, when executed by at least one processor, cause the first playback device to detect the command to establish the association comprise program instructions that, when executed by at least one processor, cause the first playback device to:
identify a trigger event indicating the command to establish the association between the first playback device and at least one playback device of the local media playback system.

18. A method carried out by a first playback device, the method comprising:
detecting a command to establish an association between the first playback device and at least one playback device of a local media playback system;
based on the command, detecting a sound specimen via at least one microphone;
transmitting, to a second playback device and a third playback device of the local media playback system, a first sound object based on the sound specimen;
based on a comparison between the first sound object and (i) a second sound object produced by the second playback device and (ii) a third sound object produced by the third playback device, determining that the first playback device has a spatial relationship with the second playback device and does not have a spatial relationship with the third playback device;
based on determining that the first playback device has a spatial relationship with the second playback device and does not have a spatial relationship with the third playback device, determining that the first playback device is to establish the association with the second playback device, and not the third playback device; and
causing the association between the first playback device and the second playback device to be established.

19. The method of claim 18, wherein the association comprises at least one of (i) a playback system membership association or (ii) a playback synchrony association indicating a given playback group configuration involving the first playback device.

20. The method of claim 19, further comprising:
after causing the association between the first playback device and the second playback device to be established, playing back audio content in synchrony with at least the second playback device.

* * * * *